(12) United States Patent
Allison et al.

(10) Patent No.: US 11,547,955 B1
(45) Date of Patent: Jan. 10, 2023

(54) PURIFICATION AND SEPARATION SYSTEM AND METHOD

(71) Applicants: Justin Allison, Ledyard, CT (US); David Struzik, North Troy, VT (US)

(72) Inventors: Justin Allison, Ledyard, CT (US); David Struzik, North Troy, VT (US)

( * ) Notice: Subject to any disclaimer, the term of this patent is extended or adjusted under 35 U.S.C. 154(b) by 0 days.

(21) Appl. No.: 17/093,068

(22) Filed: Nov. 9, 2020

Related U.S. Application Data

(63) Continuation-in-part of application No. 14/249,788, filed on Apr. 10, 2014, now Pat. No. 10,828,580.

(51) Int. Cl.
  *B01D 15/18* (2006.01)
  *B01D 15/42* (2006.01)
  *B01D 15/20* (2006.01)

(52) U.S. Cl.
  CPC ....... *B01D 15/1892* (2013.01); *B01D 15/203* (2013.01); *B01D 15/424* (2013.01)

(58) Field of Classification Search
  CPC ............ B01D 15/1828; B01D 15/1892; B01D 15/203; B01D 15/424; B01D 15/1821; B01D 15/185; B01D 2215/023; B01D 15/1807
  USPC .............................................. 210/198.2, 656
  See application file for complete search history.

(56) References Cited

U.S. PATENT DOCUMENTS

| | | | |
|---|---|---|---|
| 10,828,580 B2 * | 11/2020 | Allison | B01D 15/1871 |
| 2015/0122740 A1 * | 5/2015 | Powell | B01D 61/14 |
| | | | 210/704 |

* cited by examiner

*Primary Examiner* — Claire A Norris
(74) *Attorney, Agent, or Firm* — Steven M. McHugh

(57) ABSTRACT

A purification system for separating a molecule of interest from a solution is provided and generally includes a plurality of resin processing sections, wherein each of the resin processing sections is controllably separated from each other via a configurable valve, wherein the configurable valve is configured to introduce or evacuate a fluid/resin into/out of a proximately located processing section, a plurality of inlets configured to introduce fluid and/or resin into one or more of the plurality of resin processing sections.

1 Claim, 31 Drawing Sheets

FLOW THROUGH POSITION

Section C-C

Section F-F

Fluid Flow

PURIFICATION AND SEPARATION SYSTEM AND METHOD

RELATED APPLICATIONS

This application is a Continuation-In-Part of U.S. patent application Ser. No. 14/249,788, filed on Apr. 10, 2014 and claims the benefit of the filing date of U.S. patent application Ser. No. 14/249,788, filed on Apr. 10, 2014 and U.S. Provisional Patent Application Ser. No. 61/810,826 filed Apr. 11, 2013 and titled "Purification and Separation System and Method," the contents of both of which are incorporated by reference herein in their entireties.

FIELD OF THE INVENTION

This invention relates generally to molecular purification and more particularly to a system for biologically produced molecular purification using a mass transfer technique and article.

BACKGROUND OF THE INVENTION

Molecular purification devices for purifying ploypeptides, proteins, polysaccharides, nucleic acids and molecules are known and typically use a traditional chromatography or other established approach. These devices include chromatograpy columns and include a fixed bed of particles typically consisting of chemically active ligands that are covalently bonded to matrices of polysaccharides, organic polymers, ceramics (or other compounds) located within a cylindrical container. The system includes valves and fittings at either end with additional sensors to measure desired parameters, such as pH conductivity, pressure and Ultraviolet light to name a few. When a solution containing a molecule of interest (MOI) flows through the particle bed, the ligands capture and collect the MOI, where unwanted molecules and/or other impurities are separated from the MOI by "washing" the molecule of interest to remove the unwanted molecules and/or impurities, such as lipids, proteins, nucleic acids, saccharides, polysaccharides and/or other biologically relevant molecules which are considered impurities.

Once the MOI is captured/collected and washed, the MOI is chemically released from the ligand-matrix by using a specially formulated release solution which chemically alters the interaction (i.e. bond) between the MOI and the ligand. Thus, when the ligand-matrix containing the MOI is exposed to the release solution, the MOI is release from the ligand-matrix and contained in the release solution. These chromatography devices can used singularly or in arrangements that employ a simulated moving bed.

In one embodiment, a chromatography device that includes a simulated moving bed can be difficult to construct and uses a complicated arrangement of valves and columns. In one embodiment the chromatography device includes two or more columns that are connected to a multiport valve which distributes the solutions in a pattern to the chromatography columns.

In another embodiment, the chromatography device may be configured to take advantage of the "expanded bed" phenomenon which uses a mass of matrix-ligand particles that are suspended in a flowing liquid/gas. In this case, a solution containing the MOI is introduced into the flowing liquid/gas upstream from the mass of matrix-ligand particles. After a predetermined volume of solution interacts with the mass of matrix-ligand particles, then the bed is compressed. The MOI is then chemically released from the matrix-ligand using a release solution where the MOI is allowed to flow out of the column with the release solution.

Unfortunately, these chromatography devices require lengthy preparation and operation time and consume a considerable amount of material (i.e. martrix-ligand solution, resin, etc. . . . ), buffer and storage capacity.

SUMMARY OF THE INVENTION

A purification system for separating a molecule of interest from a solution is provided and generally includes a plurality of resin processing sections, wherein each of the resin processing sections is controllably separated from each other via a configurable gate valve, wherein the configurable gate valve is configured to introduce or evacuate a fluid/resin into/out of a proximately located processing section, a plurality of inlets configured to introduce fluid and/or resin into one or more of the plurality of resin processing sections.

A purification system for separating a molecule of interest from a solution is provided and includes a plurality of configurable plug valves, wherein each of the plurality of configurable plug valves is configurable between an open configuration and a closed configuration, wherein when in the closed configuration the configurable plug valves are configured for bi-directional portal flow. The purification system also includes a plurality of inlets and a plurality of resin processing sections configured in a series connection, wherein each of the resin processing sections is controllably separated from each other via the configurable plug valve, wherein the configurable plug valve is configured to introduce or evacuate a fluid/resin into/out of a proximately located processing section, and wherein the plurality of inlets are configured to introduce fluid and/or resin into one or more of the plurality of resin processing sections and wherein the plurality of resin processing sections includes an absorption section and a regeneration section, wherein the absorption section is located above the regeneration section and separated from the regeneration section via one of the plurality of configurable plug valves, and where the absorption section includes a larger diameter that the regeneration section.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike.

DETAILED DESCRIPTION OF THE INVENTION

In accordance with the present invention, an article and method for purifying biomolecules and other molecules, including synthetic and naturally occurring molecules, is provided, wherein the method of the invention is faster and uses less material (i.e. resin, buffer, etc.) than current biomolecular or chemical purification methods and wherein the article follows a similar "Higgins Loop" design. It is contemplated that the invention may be used for the purification of biologically synthesized molecules, including proteins, polysaccharides nucleic acids and other small molecules, either synthetic or naturally occurring, whose molecular weights are less than 12 kilodaltons. Additionally, the molecules may be extracted from biological entities including plants, bacteria, fungi, animals and cell cultures.

Overall Configuration

Figure 1:
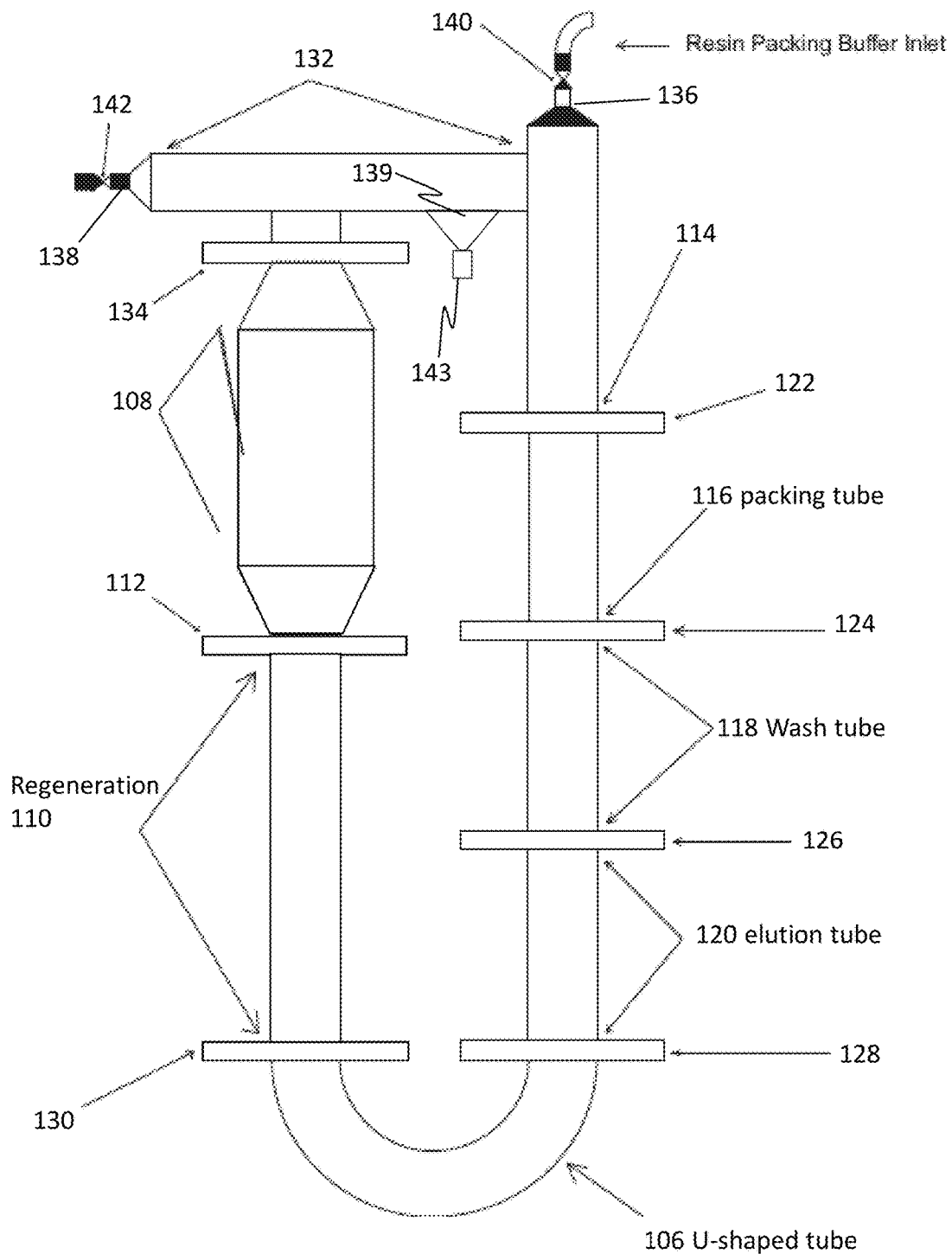
FIG. 1 is a side view of a purification system, in accordance with one embodiment of the invention.
Figure 2A:
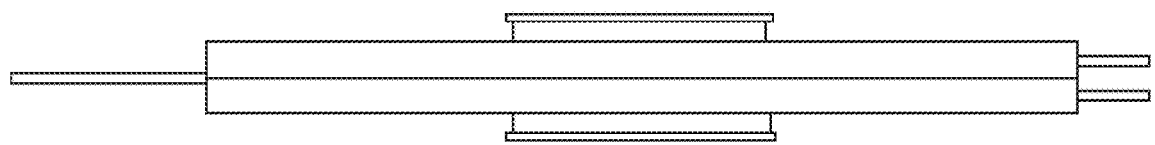
FIG. 2A is side view of a configurable gate valve for use with the purification system of FIG. 1, in accordance with one embodiment of the invention.
Figure 2B:
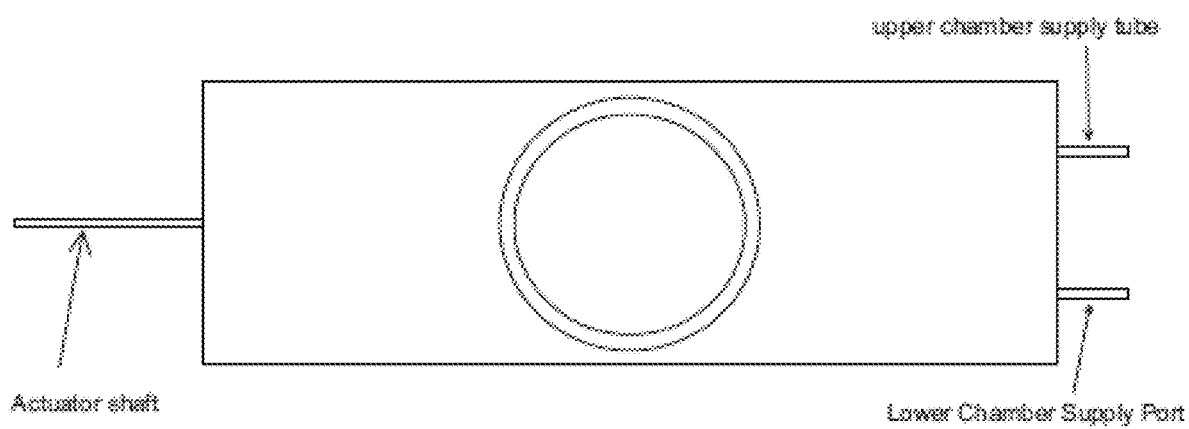
FIG. 2B is top down view of the configurable gate valve of FIG. 2A.
Figure 2C:
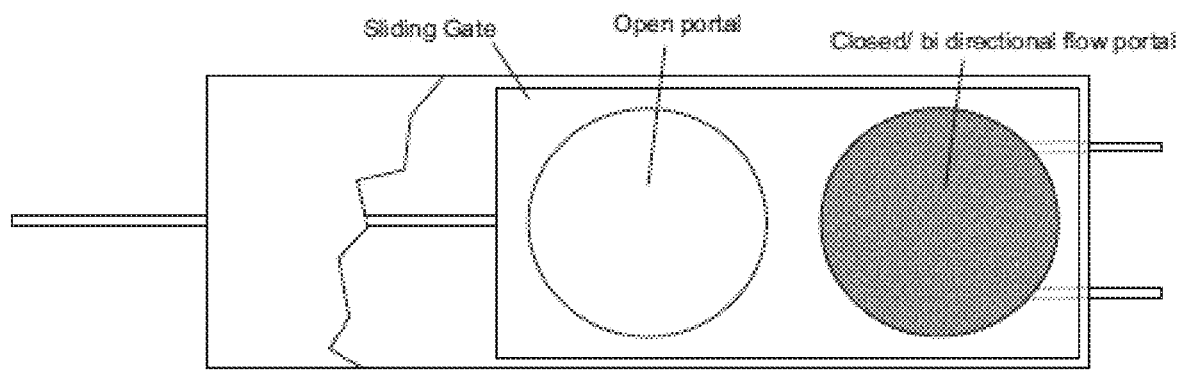
FIG. 2C is sectional cut-away top down view of the configurable gate valve of FIG. 2A.
Figure 2D:
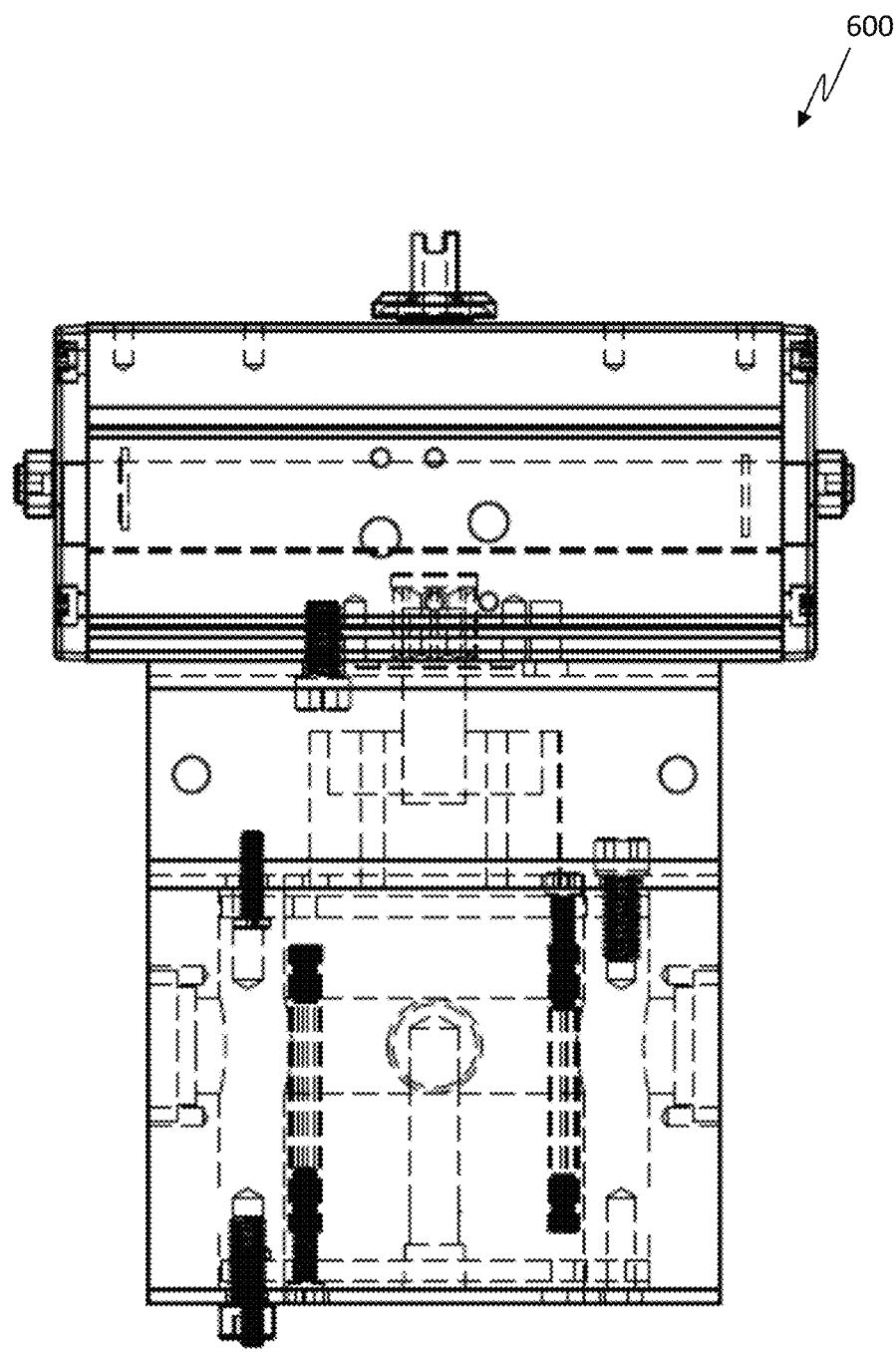
FIG. 2D is side view of a plug valve for use with the purification system of FIG. 1, in accordance with another embodiment of the invention.
Figure 2E:
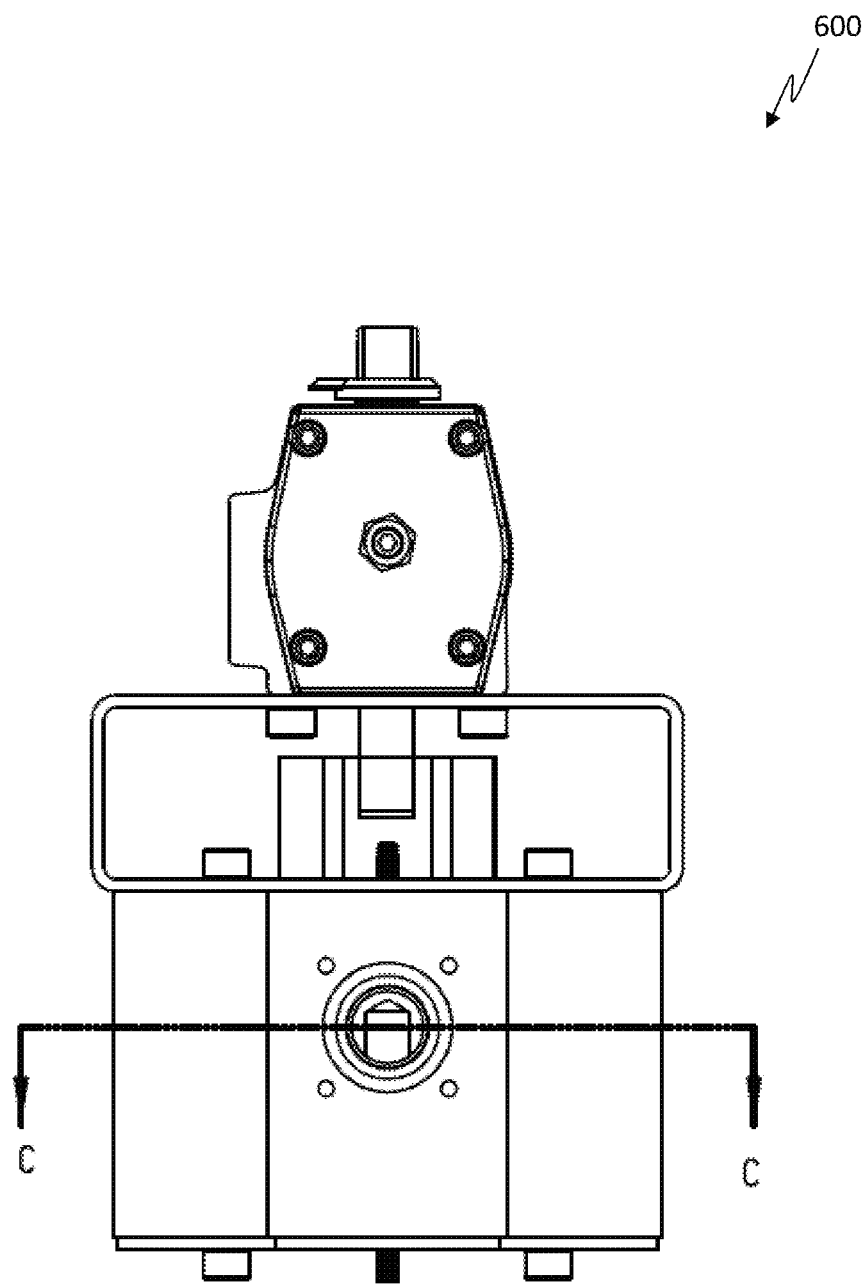
FIG. 2E is side view of the plug valve of FIG. 2D for use with the purification system of FIG. 1.
Figure 2F:
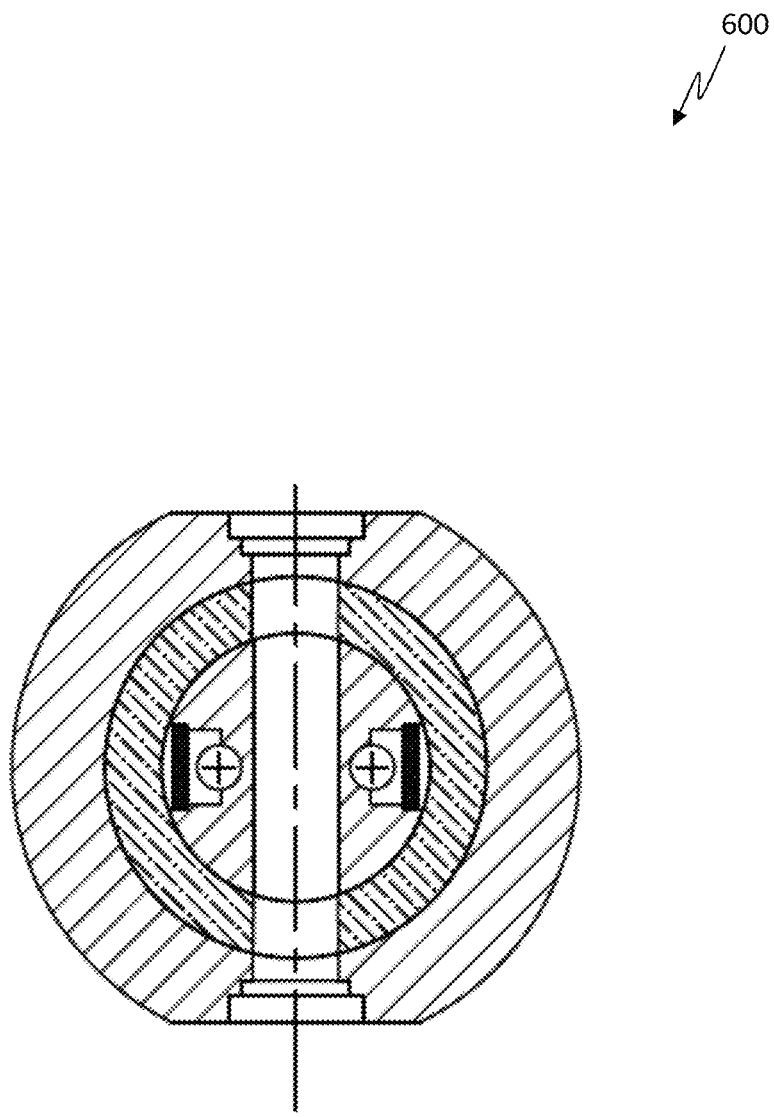
FIG. 2F is sectional view of the plug valve of FIG. 2D for use with the purification system of FIG. 1.
Figure 2G:
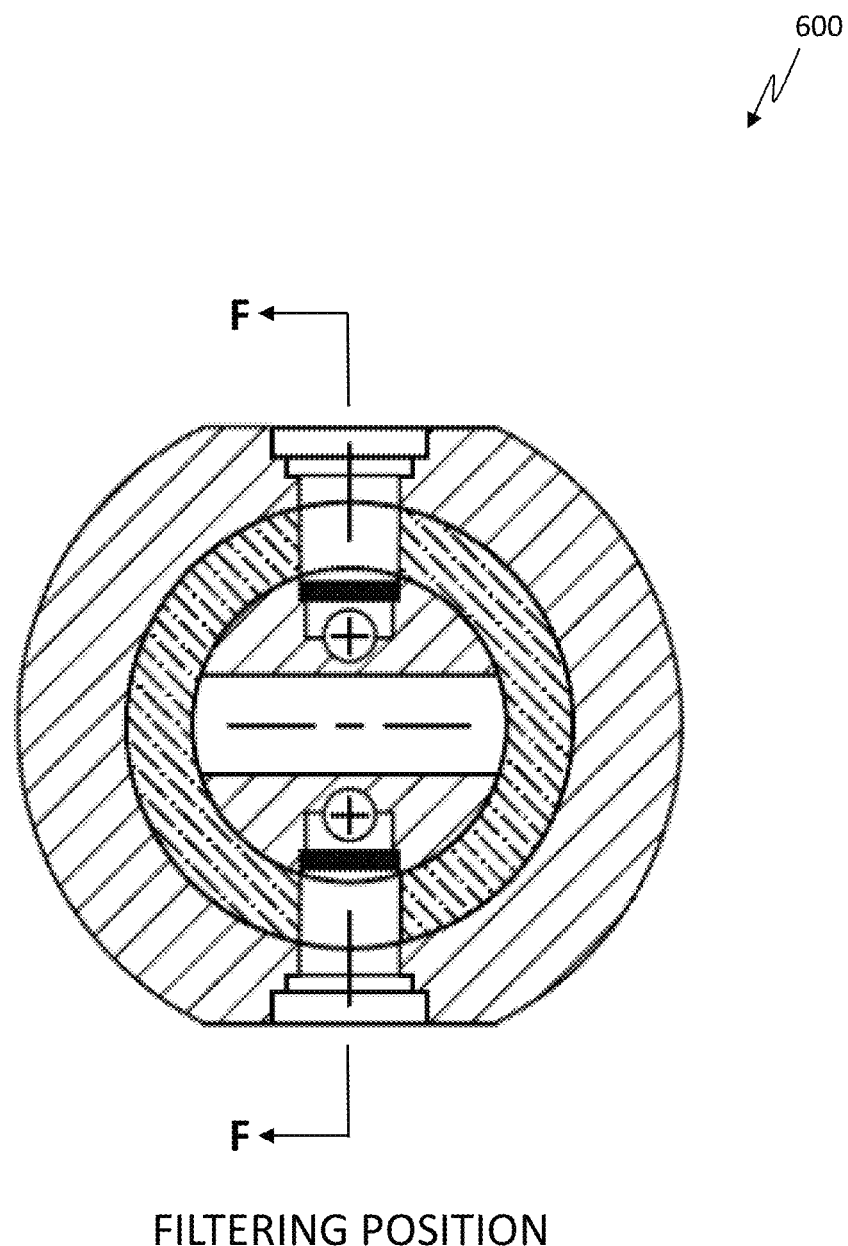
FIG. 2G is sectional view of the plug valve of FIG. 2D for use with the purification system of FIG. 1.
Figure 2H:
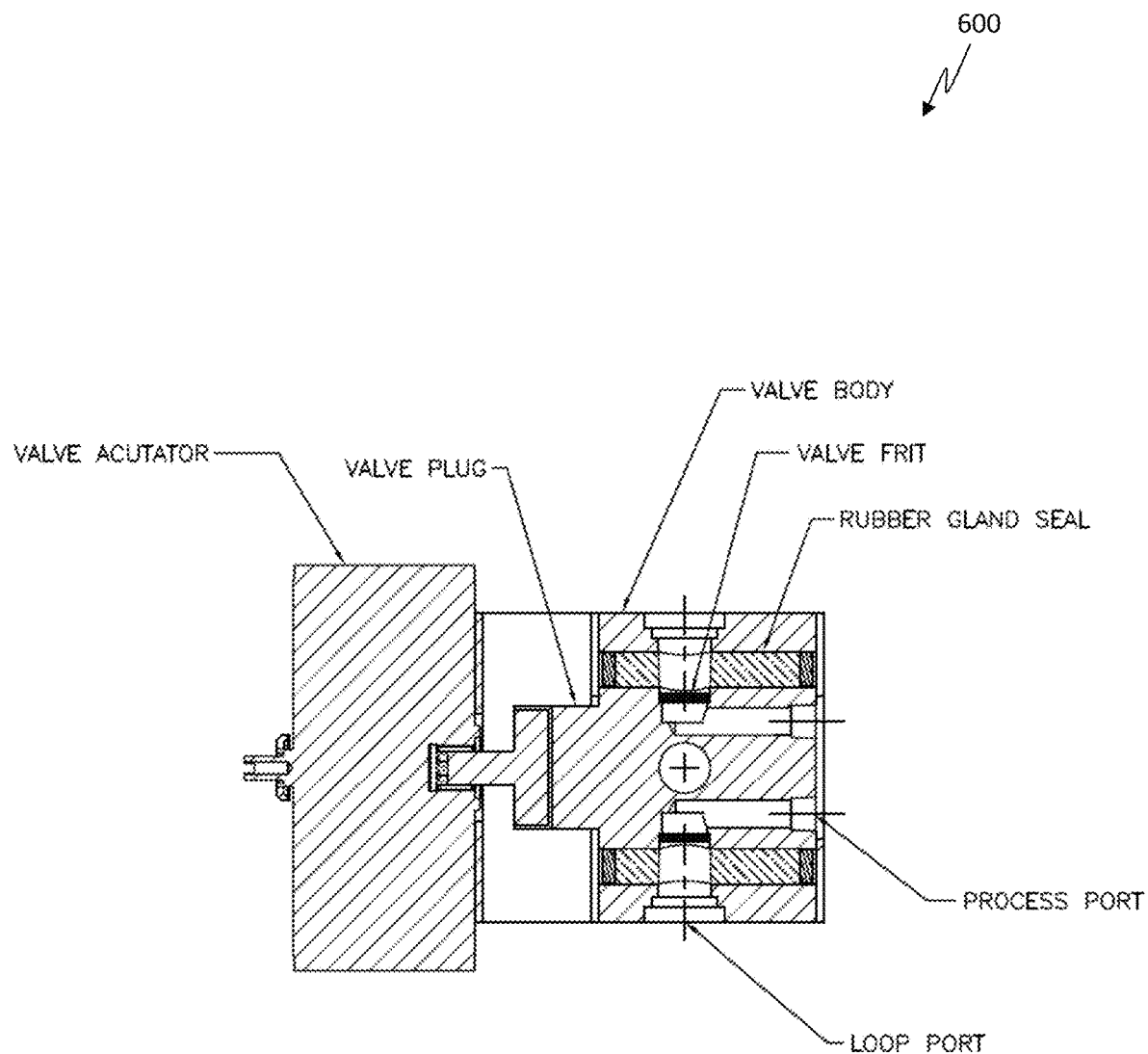
FIG. 2H is sectional view of the plug valve of FIG. 2D for use with the purification system of FIG. 1.
Figure 3:
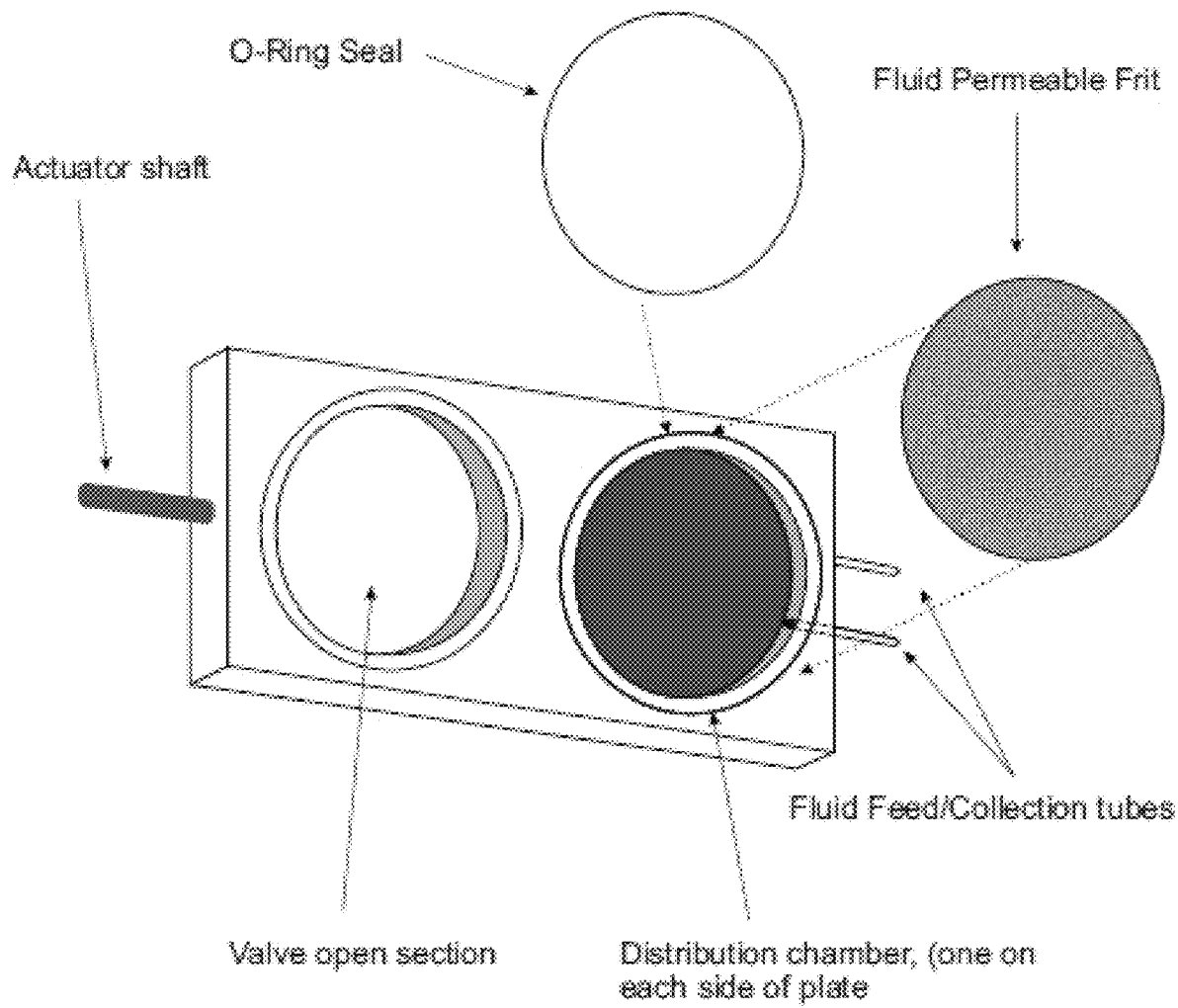
FIG. 3 is exploded top down view of the valve inner body of the configurable gate valve of FIG. 2A.

Referring to FIG. 1, a purification system 100 for separating desired MOI's is shown, in accordance with one embodiment of the invention. The purification system 100 is configured as an elongated loop of tubing having a first vertical tube section 102 and a second vertical tube section 104 in flow communication with each other via a U-shaped tube connector 106. The first vertical tube section 102 includes an absorption tube section 108 in flow communication with a regeneration tube section 110, where the absorption tube section 108 is located above the regeneration tube section 110 and is separated from the regeneration tube section 110 via a first configurable gate valve 112.

The second vertical tube section 104 includes a transport tube section 114, a packing tube section 116, a wash tube section 118 and an elution tube section 120, wherein the transport tube section 114 is separated from the packing tube section 116 via a second configurable gate valve 122, the packing tube section 116 is separated from the wash tube section 118 via a third configurable gate valve 124 and the wash tube section 118 is separated from the elution tube section 120 via a fourth configurable gate valve 126. The elution tube section 120 is separated from the U-shaped tube connector 106 via a fifth configurable gate valve 128 and the regeneration tube section 110 is separated from the U-shaped tube connector 106 via a sixth configurable gate valve 130.

The purification system 100 further includes a resin cross-over tube section 132 which is in flow communication with the transport tube section 114 and the absorption tube section 108, wherein the resin cross-over tube section 132 is separated from the absorption tube section 108 via a seventh configurable gate valve 134. Additionally, the transport tube section 114 further includes a resin packing buffer inlet 136 and the resin cross-over tube section 132 includes a resin movement buffer supply inlet 138. It should be appreciated that a resin packing buffer inlet valve 140 is provided to control inflow from the resin packing buffer inlet 136 and a resin movement buffer supply inlet valve 142 is provided to control inlet flow from the resin movement buffer supply inlet 138. Furthermore, an additional resin movement buffer supply inlet 139 having a resin movement buffer supply inlet valve 143 may be provided to control the inlet flow of additional resin movement buffer. It should be appreciated that the inclusion of the additional resin movement buffer supply inlet 139 and resin movement buffer supply inlet valve 143 may advantageously minimize or eliminate the aggregation of resin along the resin cross-over tube section 132. Additionally, this helps to create the turbulence needed to keep the resin in suspension so that it moves into the packing tube section 116 and form a proper bed.

It should be appreciated that the regeneration tube section 110, wash tube section 118 and/or elution tube section 120 may be equipped with any number of electrodes as desired and necessary to achieve the desired end purpose, where the electrodes may be constructed of a suitable material and arranged in a vertical, horizontal and/or vertical/horizontal orientation (i.e. some vertical, some horizontal) and which are connected to a power supply. As such, the electrodes may supply an electrical current which either supplements or replaces the chemical activity provided by the solutions flowing in these sections.

Additionally, in one embodiment the wash tube section 118, elution tube section 120, and/or regeneration tube section 110 may have its associated valves connected to a reagent generator which operates using an electrolytic cell and a galvanic cell (or an oxidation reduction reactor or other suitable power device) to produce acidic and alkaline or other reagents from a solution containing precursor compounds.

Moreover, it should be appreciated that other types of valves may be used in place of one or more of the configurable gate valves 112, 122-130, 134. For example, referring to FIG. 2D, FIG. 2E, FIG. 2F, FIG. 2G and FIG. 2H, one type of valve that may be used is a plug valve 600. This type of valve may be more practical to use in smaller sizes.

Gate Configuration

Referring to FIG. 2A, FIG. 2B, FIG. 2C and FIG. 3, it should be appreciated that the tubes and configurable gate valves 112, 122-130, 134 may be constructed from a solid material, such as plastic, composite, metal and/or other suitable solid material. The configurable gate valves include a valve outer body 144 and a valve inner body 146. The valve outer body 144 defines a valve body cavity 148 and includes an outer body top 150 having a top opening 152 and an outer body bottom 154 having a bottom opening 156, wherein the top opening 152 and bottom opening 156 are communicated with the valve body cavity 148 and aligned such that the top opening 152 is communicated with the bottom opening 156.

The valve inner body 146 is slidably contained within the valve body cavity 148 and includes a valve inner body top 158, a valve inner body bottom 160, an inner body configuration shaft 162, a first portal 164, a second portal 166 and a third portal 168. In one embodiment, a pneumatic or hydraulic fitting may be used as the inner body configuration shaft 162 thus allowing the inner body configuration shaft 162 to be operated in a piston like fashion using the hydraulic principal. It should be appreciated that the first portal 164 is a cavity that communicates the valve inner body top 158 with the valve inner body bottom 160. It should be further appreciated that the second portal 166 is located in the valve body inner body top 158 and the third portal 168 is located in the valve body inner body bottom 160, where the second portal 166 and third portal 168 are aligned with each other and separated by an impermeable solid structure. Additionally, the second portal 166 includes a second portal cavity 170 and the third portal 168 includes a third portal cavity 172, wherein each of the second portal cavity 170 and the third portal cavity 172 have a portal cavity depth $P_d$ which extends into the valve inner body 146.

The valve inner body 146 also includes a second portal flow tube 174 which is in flow communication with the second portal cavity 170 and a third portal flow tube 176 which is in flow communication with the third portal cavity 172. This allows fluids to be injected into or evacuated from the second portal cavity 170 and the third portal cavity 172. In one embodiment, the portal flow tubes 174, 176 may be absent. The inner body may include a number of internal conduits having one end that open into the portal cavities. The other end of these conduits may be configured in such a way that they are in flow communication with ports in the outer body when the inner body is configured in the closed position. It should be appreciated that a fluid permeable frit (or filter) may be provided between the adjacent section and the portal cavities 170, 172 and/or portal flow tubes 174, 176 and or the internal conduits. The fluid permeable frit (or filter) may be selected based on the size and/or type of the molecule of interest looking to be captured or recovered. The inner body configuration shaft 162 is connected to the valve inner body 146 and is used to configure the valve inner body 146 between an open configuration and a closed configuration. In one embodiment, the configuration shaft may be replaced by a pneumatic or hydraulic device which allows the inner body to operate in a piston fashion using the pneumatic or hydraulic principal. When in the open configuration, the valve inner body 146 is located within the valve body cavity 148 such that the first portal 164 is in flow communication (i.e. aligned with) the tube portion of the adjacent tube sections. When in the closed configuration, the valve inner body 146 is located within the valve body cavity 148 such that the second portal 166 and the third portal 168 is in flow communication (i.e. aligned with) the tube portion of their respectively adjacent tube sections.

It should be appreciated that in another embodiment, the portal flow tubes may be omitted, wherein when in the closed configuration, the conduits which open in the portal cavities may communication with ports in the outer body, allowing process fluids to enter the portal cavities via ports in the outer body and through the conduits in the inner body. The opposite openings of these ports may be configured in such a way that they are in flow communication with ports in the outer body when in the inner body is configured in the closed position.

Operation of Purification System

Figure 4:
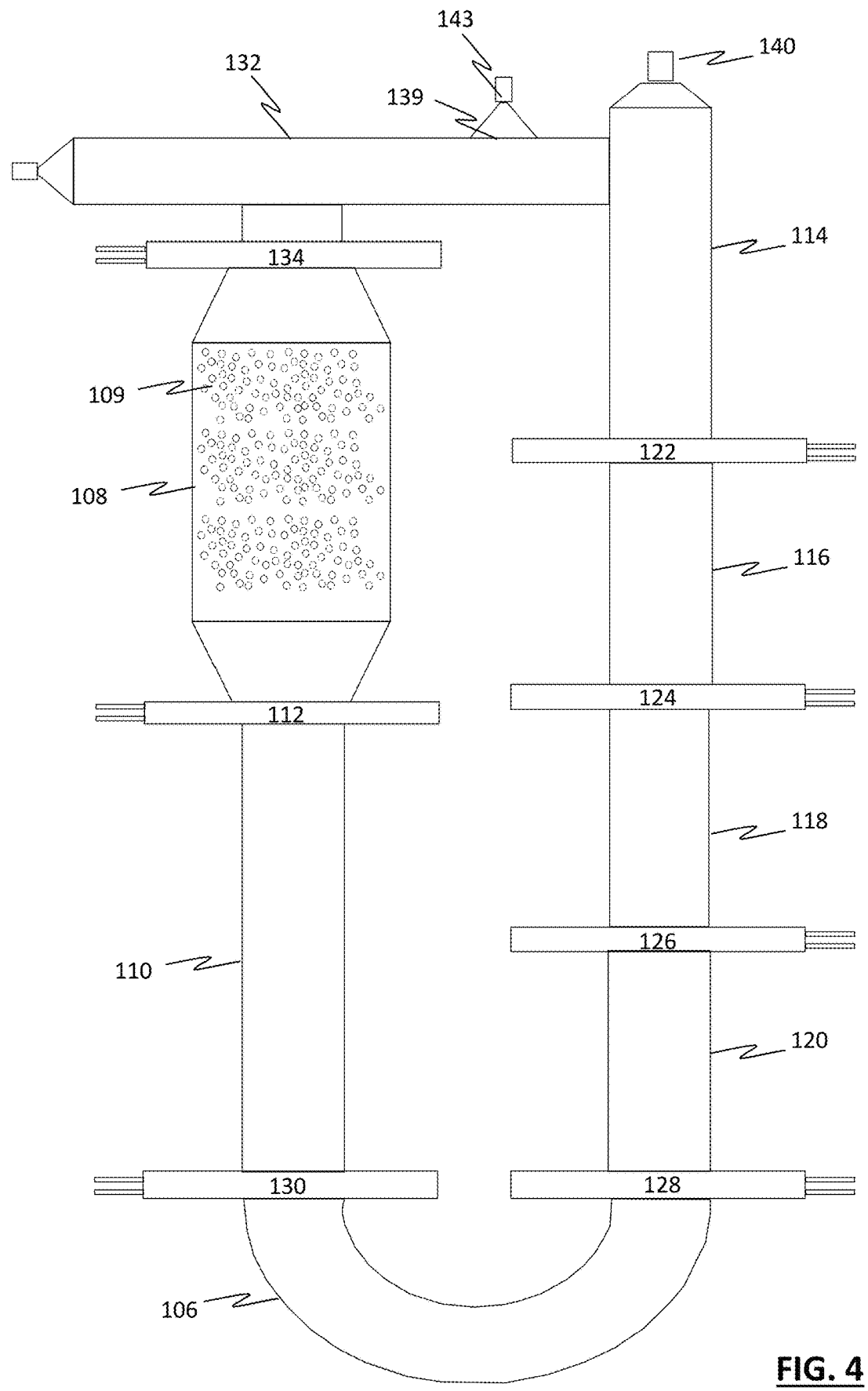
FIG. 4 is a side view of the purification system of FIG. 1 configured for operation, in accordance with one embodiment of the invention.

Referring to FIG. 4, a method for operating the purification system 100 is discussed herein after in terms of obtaining an MOI from a single 'batch' of resin. It should be appreciated that the purification system 100 may be operated to obtain MOI's from multiple batches of resin in an 'assembly line' like process. In this case, the purification system 100 may be prepared for operation by configuring the configurable gate valves 112, 122-130, 134 to be in the closed configuration and by configuring the absorption tube section 108 to contain a uniform bed of 'clean' chromatography resin 109.

Figure 5:
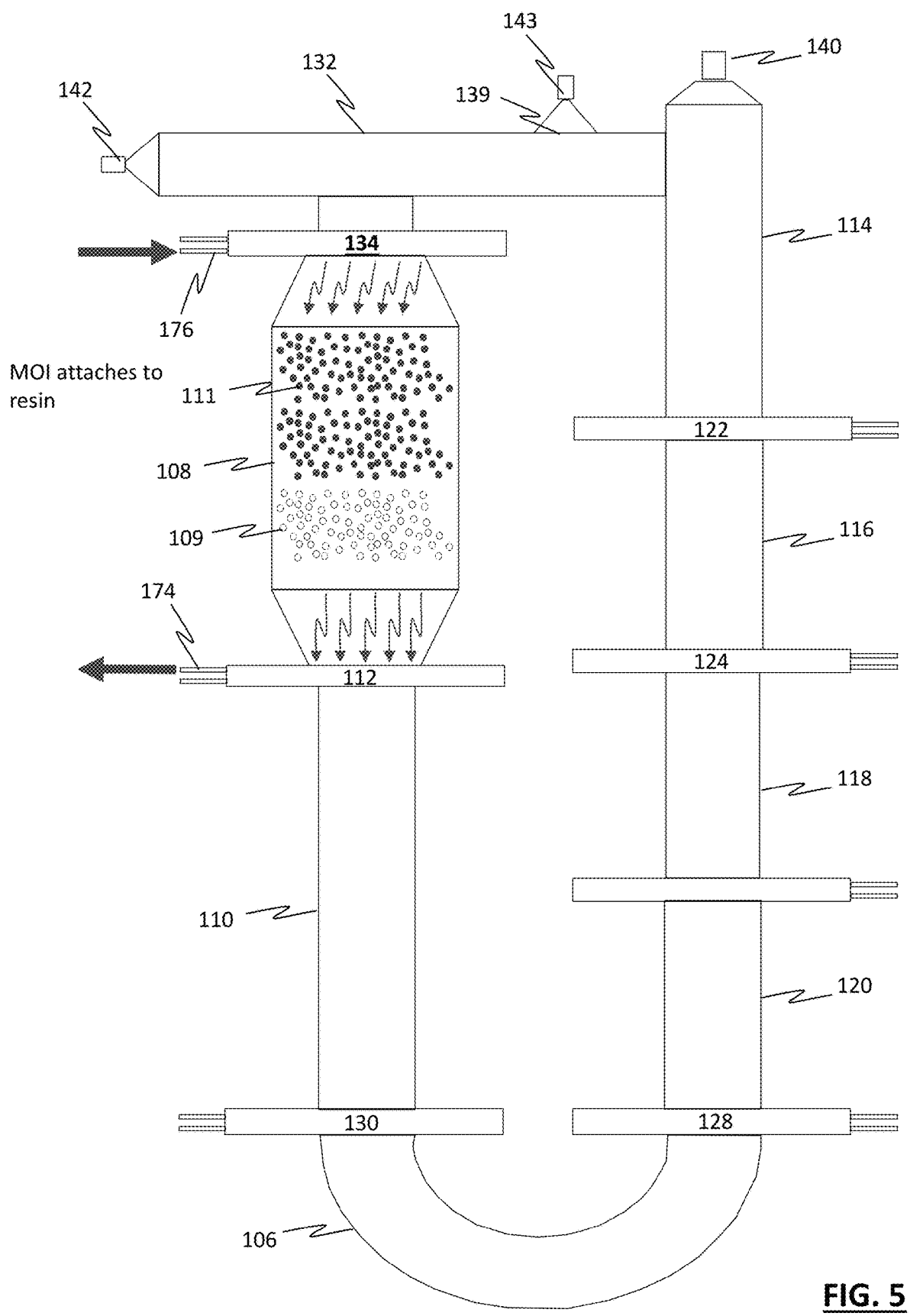
FIG. 5 is a side view of the purification system of FIG. 4 illustrating one phase of operation, in accordance with one embodiment of the invention.

Referring to FIG. 5, a solution containing the MOI is injected into the absorption section 108 via the third portal flow tube 176 of the configurable gate valve 134. As the solution flows into the third portal cavity 172, through a frit separating the third portal cavity 172 and the absorption section 108 and into the absorption section 108 through the clean resin 109, the MOI and some impurities are absorbed by the upper most portion of resin contained within the absorption section 108 to create MOI resin 111. The solution continues to flow through the resin, through a frit separating the second portal cavity 170 and the absorption section 108, into the second portal cavity 170 and through the second portal flow tube 174 of gate valve 112 and out of the purification system 100. It should be appreciated that the solution may flow through the second portal flow tube 174 via a vacuum or via gravity feed.

Figure 6:
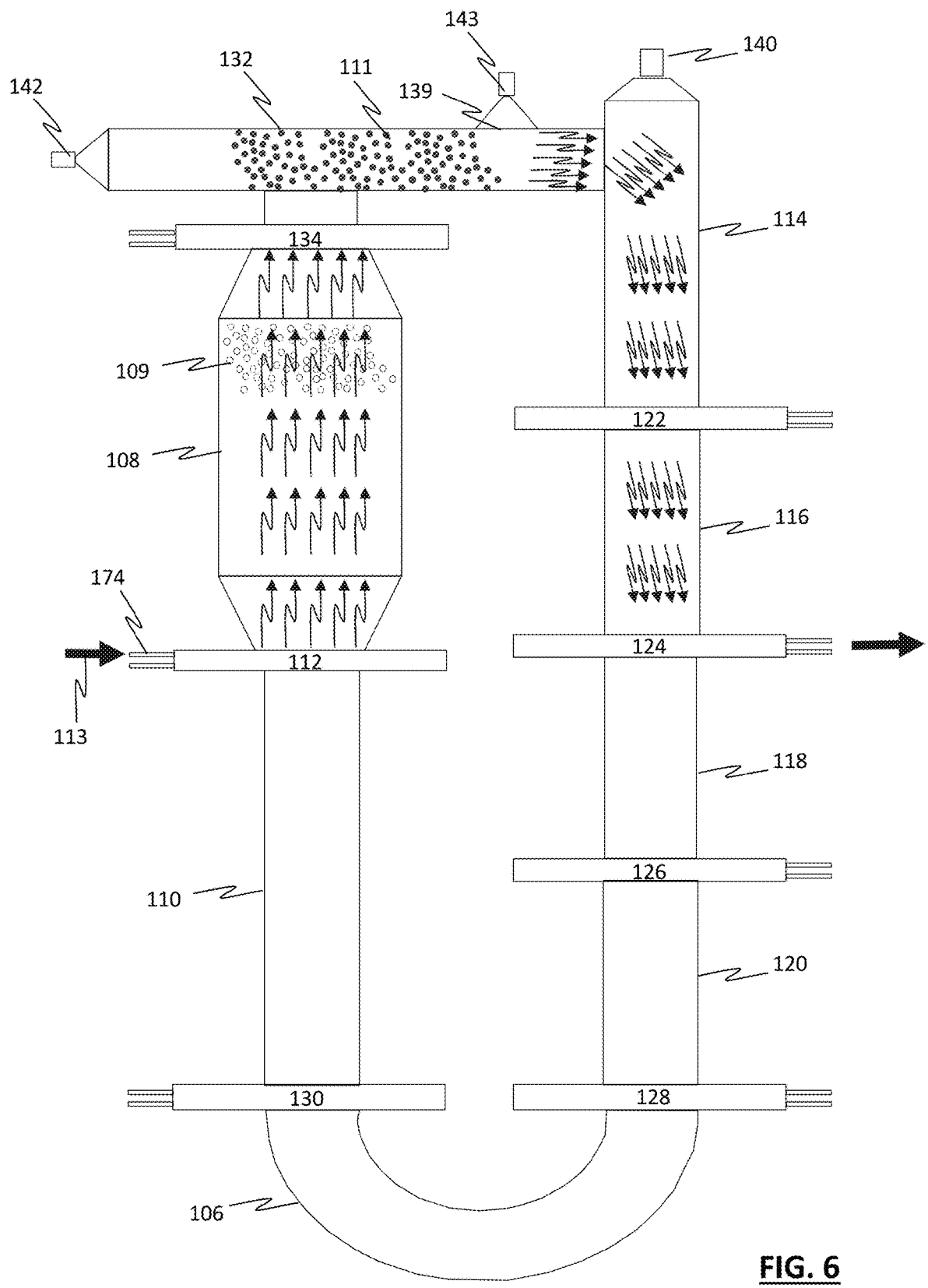
FIG. 6 is a side view of the purification system of FIG. 4 illustrating another phase of operation, in accordance with one embodiment of the invention.
Figure 7:
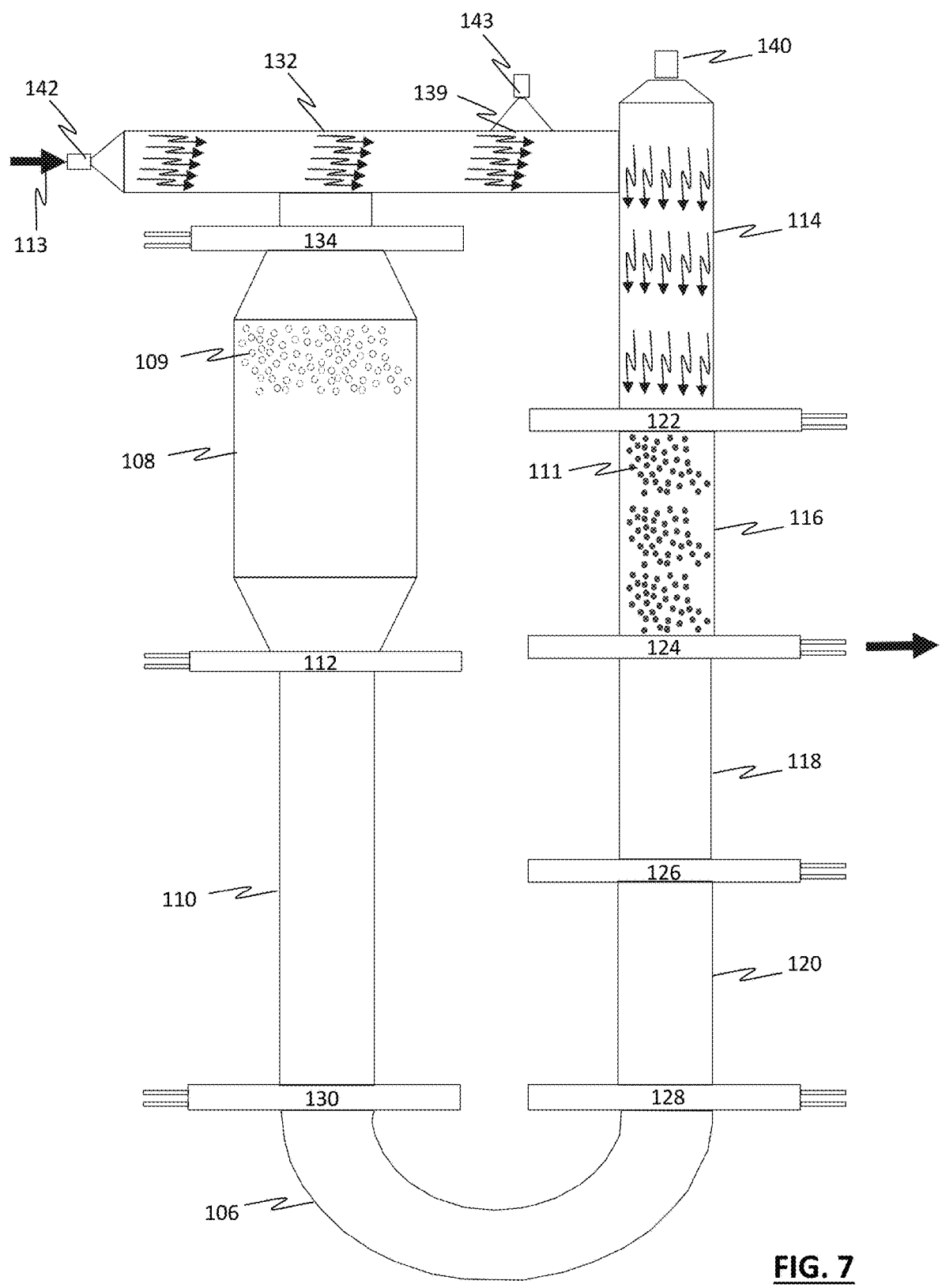
FIG. 7 is a side view of the purification system of FIG. 4 illustrating another phase of operation, in accordance with one embodiment of the invention.

Referring to FIG. 6, once the solution is evacuated from the absorption section 108, the seventh configurable gate valve 134 and second configurable gate valve 122 are configured into the open configuration and resin movement fluid is pumped into the absorption section 108 via the second portal flow tube 174 of the first configurable gate valve 112, where the solution flows into the second portal cavity 170 of the first configurable gate valve 112, through a frit separating the second portal cavity 170 and into the absorption section 108. As resin movement fluid is pumped into the absorption section 108, the resin contained within the absorption section 108 is raised up to the top of the absorption section 108 causing the top portion of the resin, which contains the MOI resin 111, to flow through the seventh configurable gate valve 134 and into the resin cross-over tube section 132. Referring to FIG. 7, at this point the resin movement buffer supply inlet valves 142, 143 are opened allowing resin movement buffer fluid 113 to flow through the resin movement buffer supply inlets 138, 139 and into the resin cross-over tube section 132. Additionally, the second portal flow tube 174 of the third configurable gate valve 124 is opened to allow the resin movement buffer fluid to flow through the frit separating the packing tube section 116 from the second portal cavity 170 of the third configurable gate valve 124, into the second portal cavity 170 of the third configurable gate valve 124 and out of the second portal flow tube 174. Thus, the flow of the resin movement buffer fluid 113 'pushes' the MOI resin 111 through the resin cross-over tube section 132 and the transport tube section 114 and into the packing tube section 116. It should be appreciated that the flow through the second portal flow tube 174 may be generated by pressure, gravity or suction, where the frit prevents the resin from flowing out of the second portal flow tube 174

Figure 8:
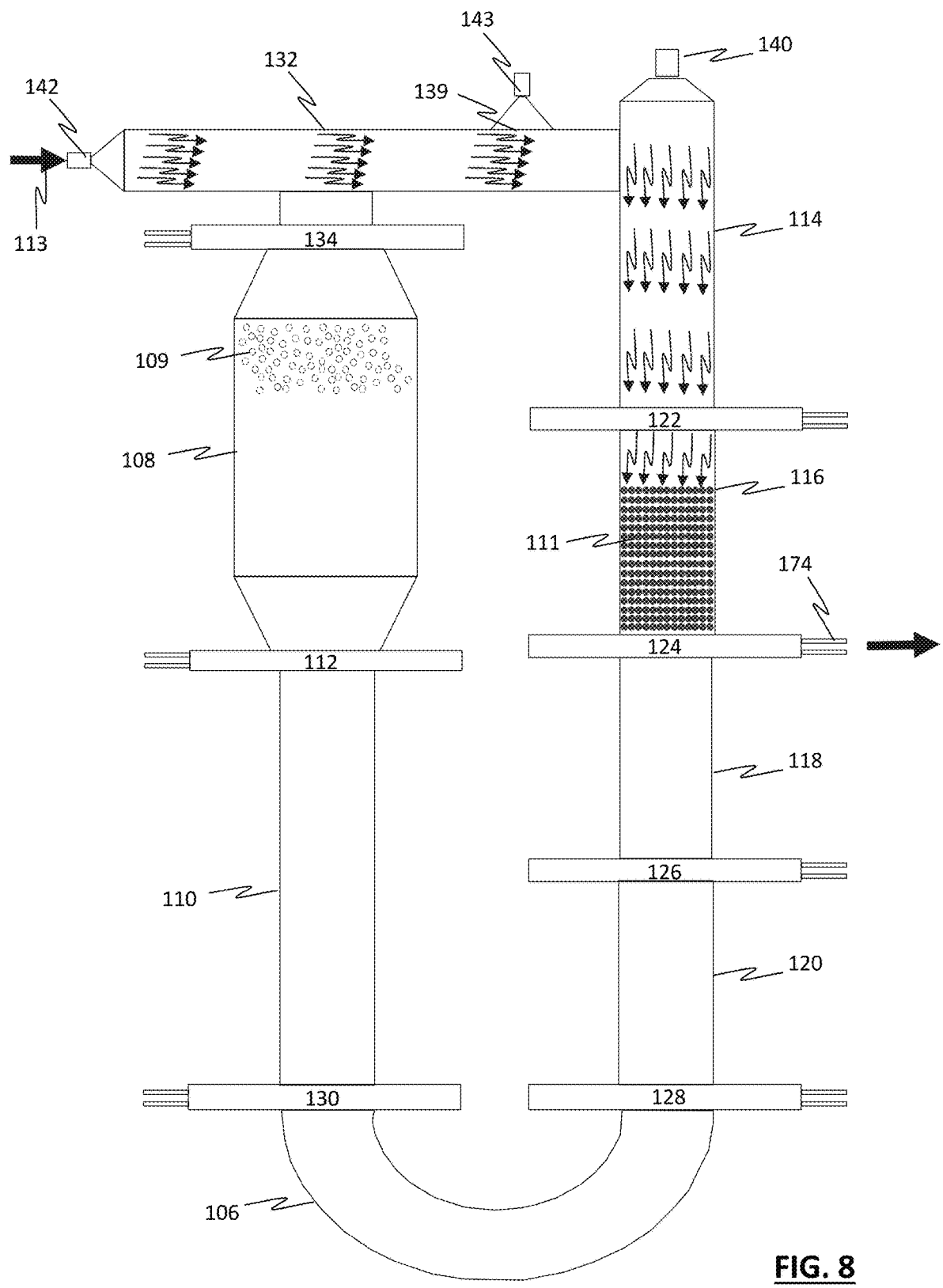
FIG. 8 is a side view of the purification system of FIG. 4 illustrating another phase of operation, in accordance with one embodiment of the invention.
Figure 9:
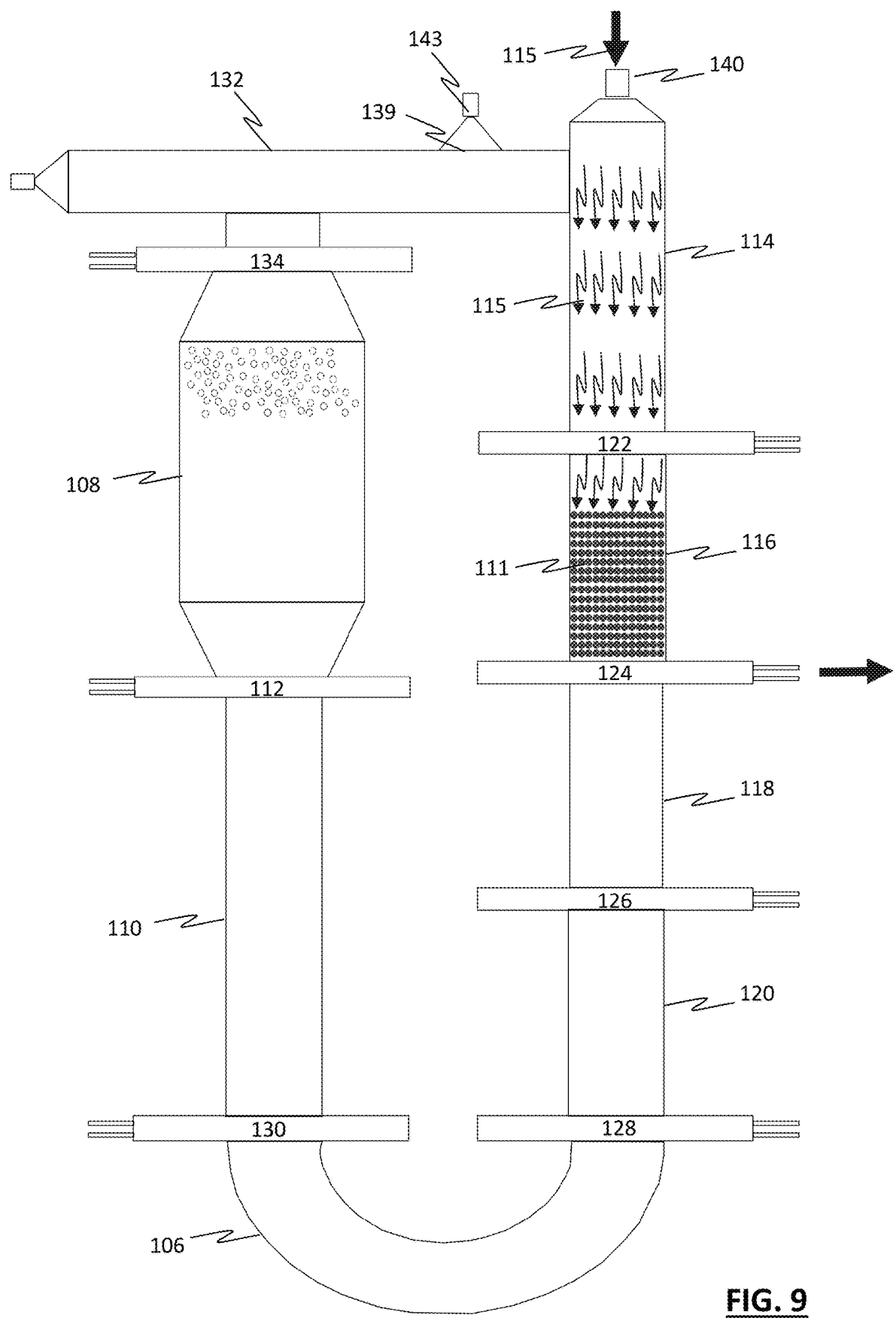
FIG. 9 is a side view of the purification system of FIG. 4 illustrating another phase of operation, in accordance with one embodiment of the invention.

Referring to FIG. 8, this flow of resin movement fluid 113 causes the MOI resin 111 to be located within the packing tube section 116. After all the MOI resin 111 is moved into the packing tube section 116, the resin movement buffer supply inlet valves 142, 143 are closed. Referring to FIG. 9, at this point the resin packing buffer inlet valve 140 is opened and resin packing buffer fluid 115 is allowed to flow through the resin packing buffer inlet 136, through the transport tube section 114, through the second configurable gate 122 (which is open) and into the packing tube section 116 and out of the second portal flow tube 174 of third configurable gate valve 124. When the resin bed is sufficiently compacted within the packing tube section 116, the flow of the resin packing buffer fluid 115 is stopped and the configurable gate valve 122 is closed.

Figure 10:
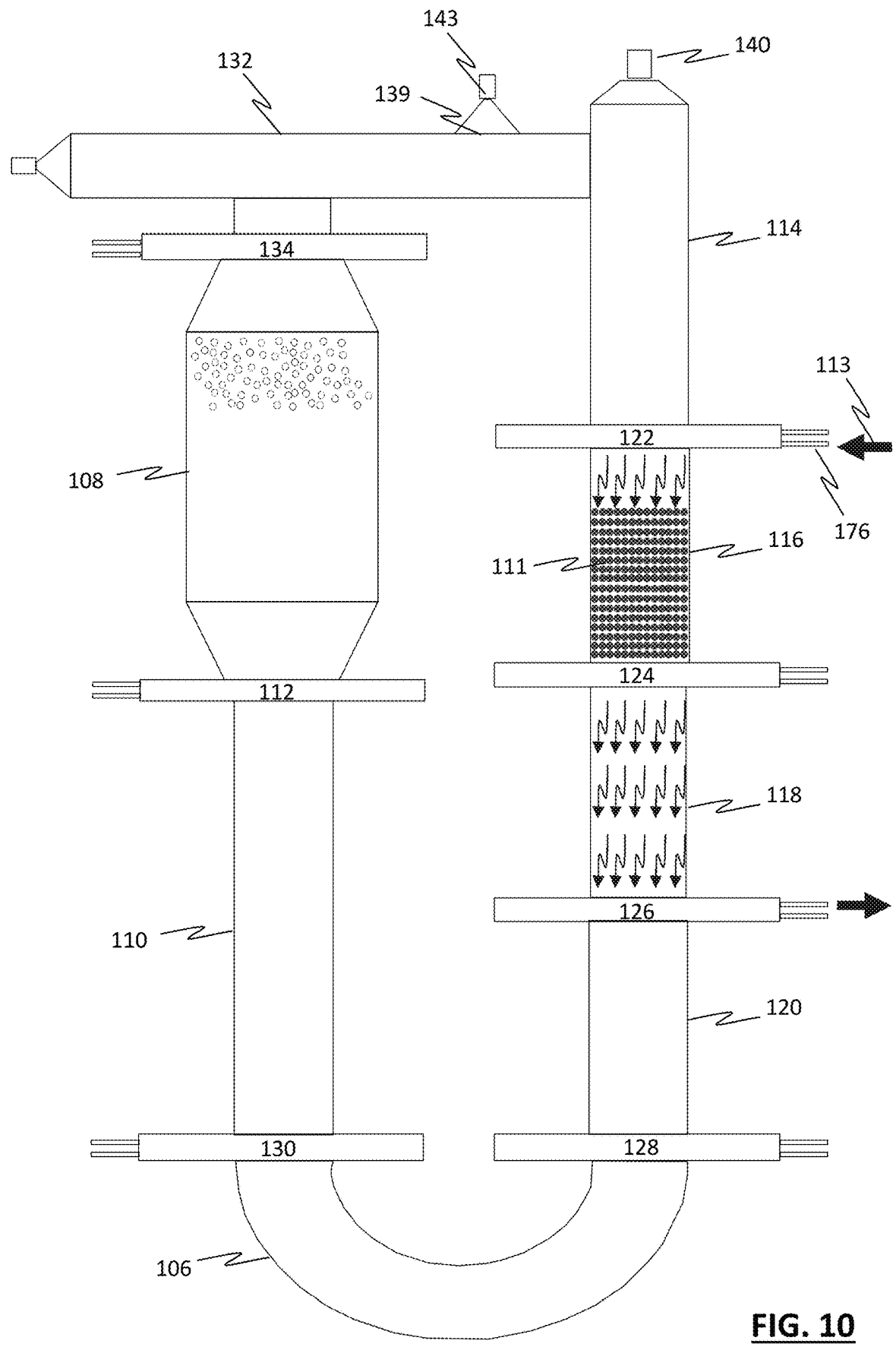
FIG. 10 is a side view of the purification system of FIG. 4 illustrating another phase of operation, in accordance with one embodiment of the invention.
Figure 11A:
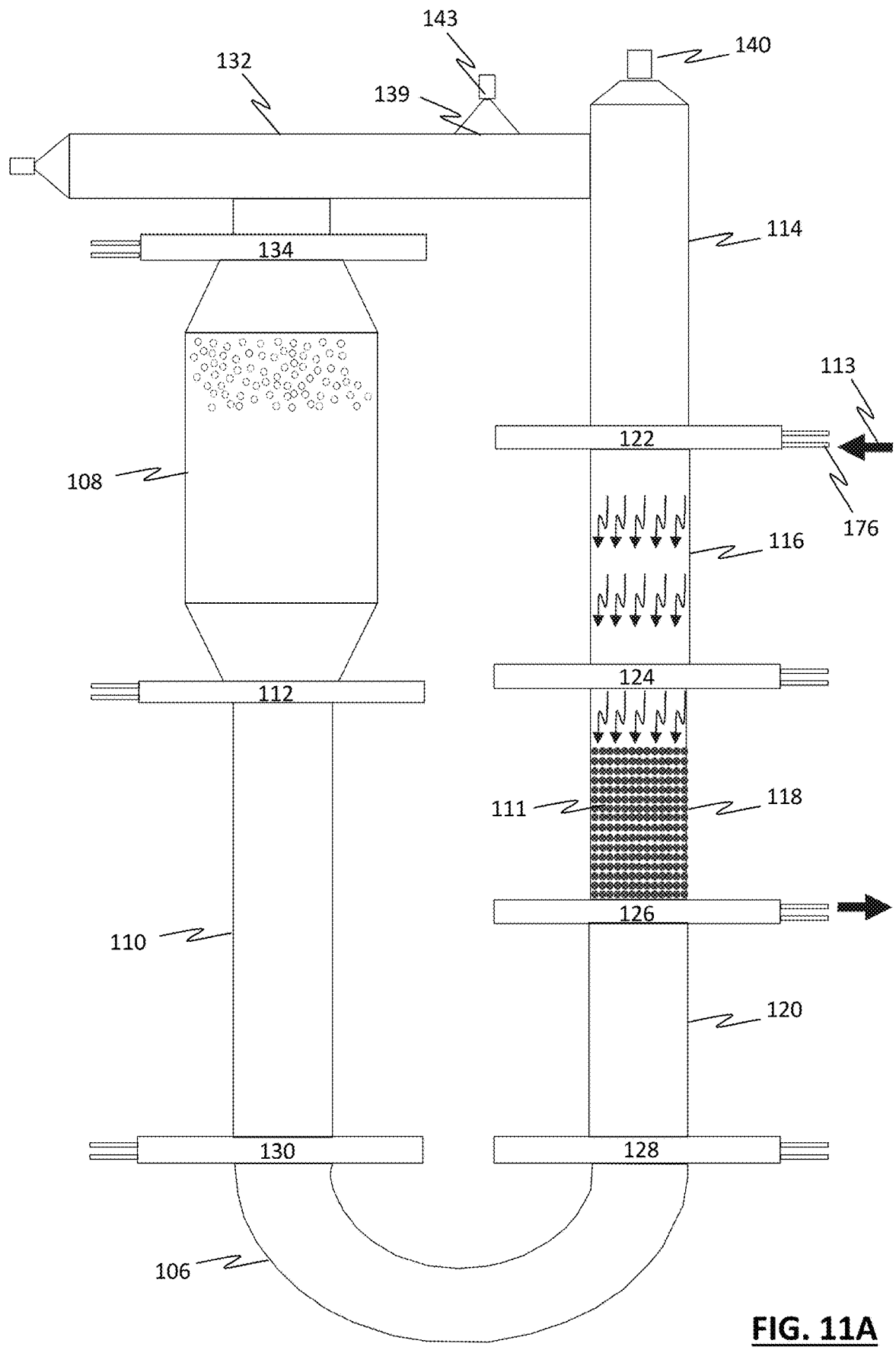
FIG. 11A is a side view of the purification system of FIG. 4 illustrating another phase of operation, in accordance with one embodiment of the invention.

Referring to FIG. 10 and FIG. 11A, at this point the third configurable gate valve 124 is configured to be open and resin movement fluid 113 is introduced into the packing tube section 116 by pumping the resin movement fluid 113 through the third portal flow tube 176 of second configurable gate valve 122, into the third portal cavity 172 and through the frit separating the third portal cavity 172 and the packing tube section 116. As the third configurable gate valve 124 is open, the resin movement fluid 113 'pushes" the packed MOI resin 111 containing the MOI out of the packing tube section 116 and into the wash tube section 118. After all of the MOI resin 111 is removed from the packing tube section 116 and contained in the wash tube section 118, the introduction of the resin movement fluid 113 is stopped and third configurable gate valve 124 is closed.

Figure 11B:
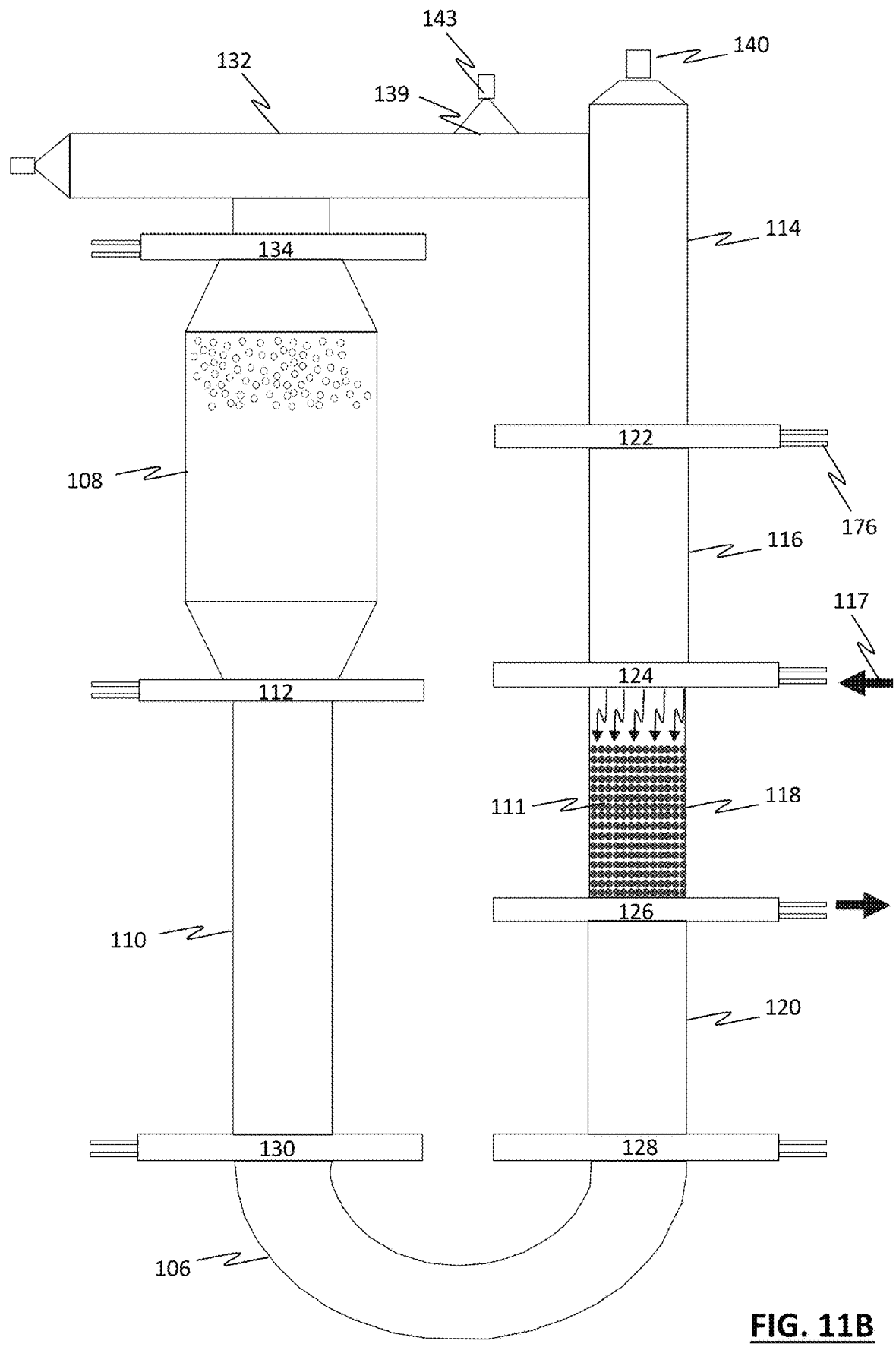
FIG. 11B is a side view of the purification system of FIG. 4 illustrating another phase of operation, in accordance with one embodiment of the invention.

Referring to FIG. 11B, a solution 117 containing solutes required to remove impurities from the resin is introduced into the wash tube section 118 via the third portal flow tube 176 of the fourth configurable gate valve 124, into the third portal cavity 172 and through the frit separating the third portal cavity 172 and the wash tube section 118 and into the wash tube section 118. The solution then flows into and through the resin bed contained in the wash tube section 118 where impurities are removed from the resin due to the interaction of the solution and resin. It should be appreciated that in another embodiment, as the solution is flowing through the wash tube section 118, an electric current may be introduced (such as, for example via the electrodes included in the wash tube section 118). The solution containing the impurities then flows through the frit separating the second portal cavity 170 of the fourth configurable gate valve 126 and the wash tube section 118, into the second portal cavity 170 and through the second portal flow tube 174 where the solution containing the impurities is collected or rendered to waste.

Figure 12:
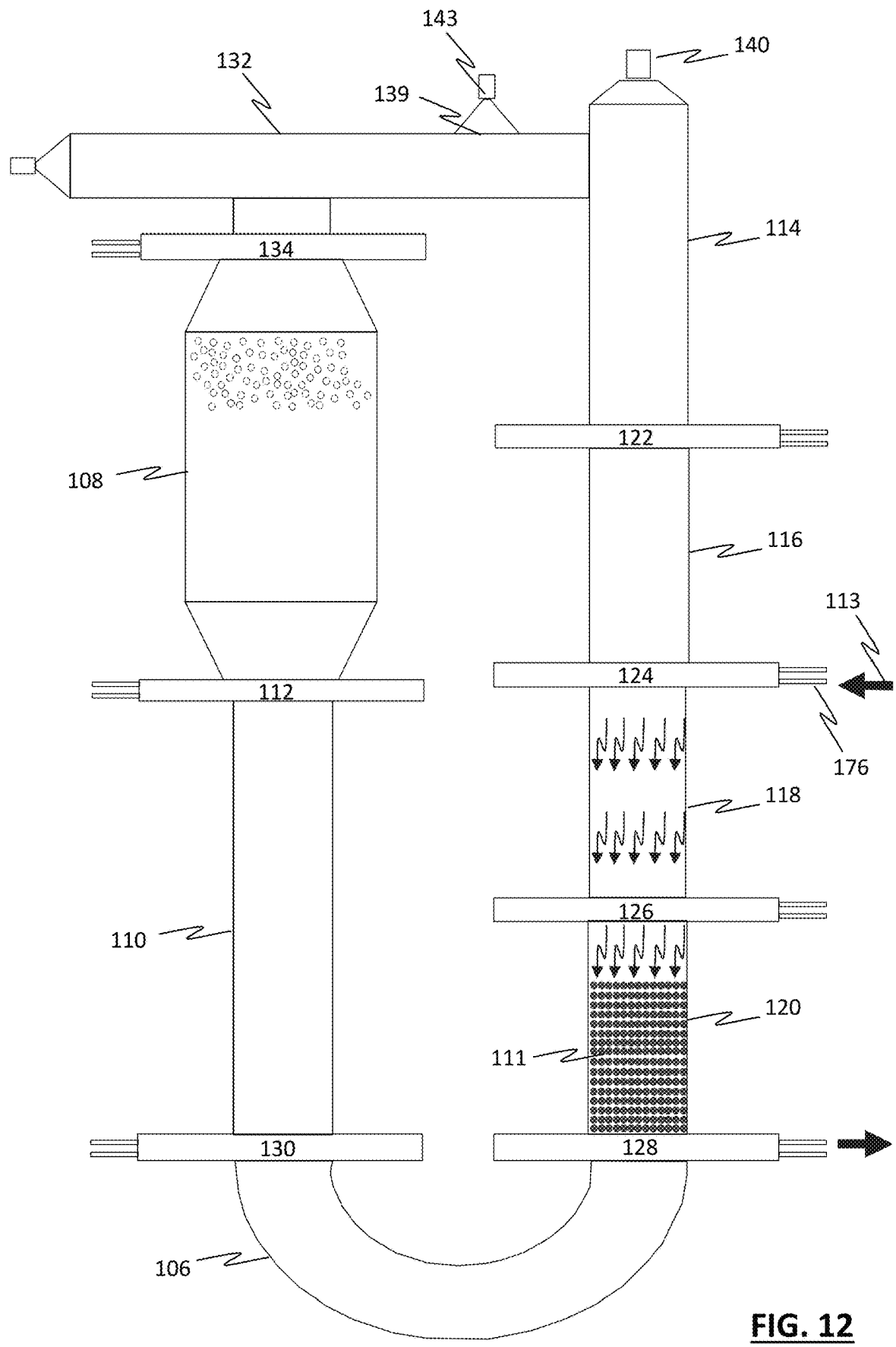
FIG. 12 is a side view of the purification system of FIG. 4 illustrating another phase of operation, in accordance with one embodiment of the invention.
Figure 13:
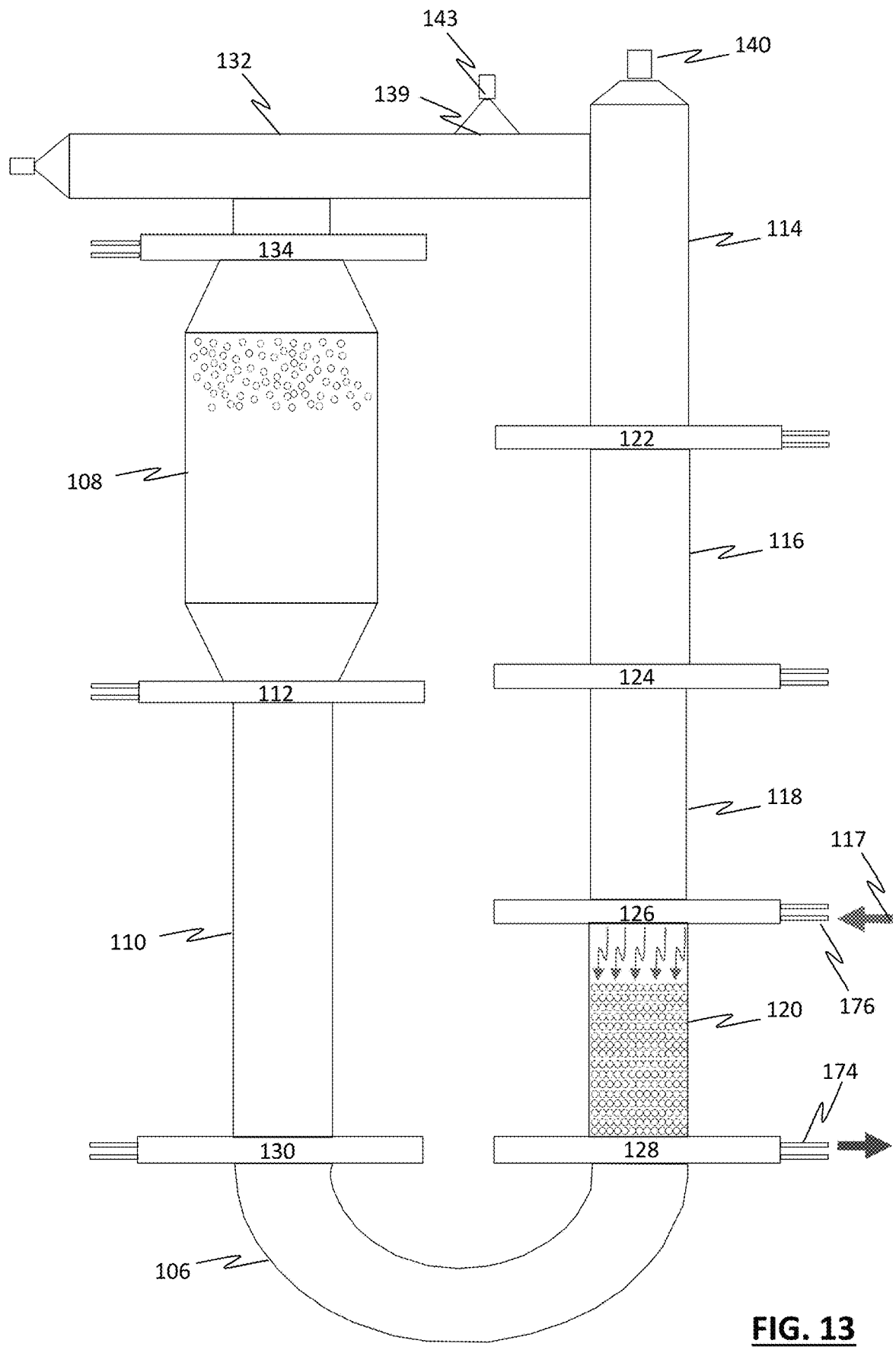
FIG. 13 is a side view of the purification system of FIG. 4 illustrating another phase of operation, in accordance with one embodiment of the invention.
Figure 14:
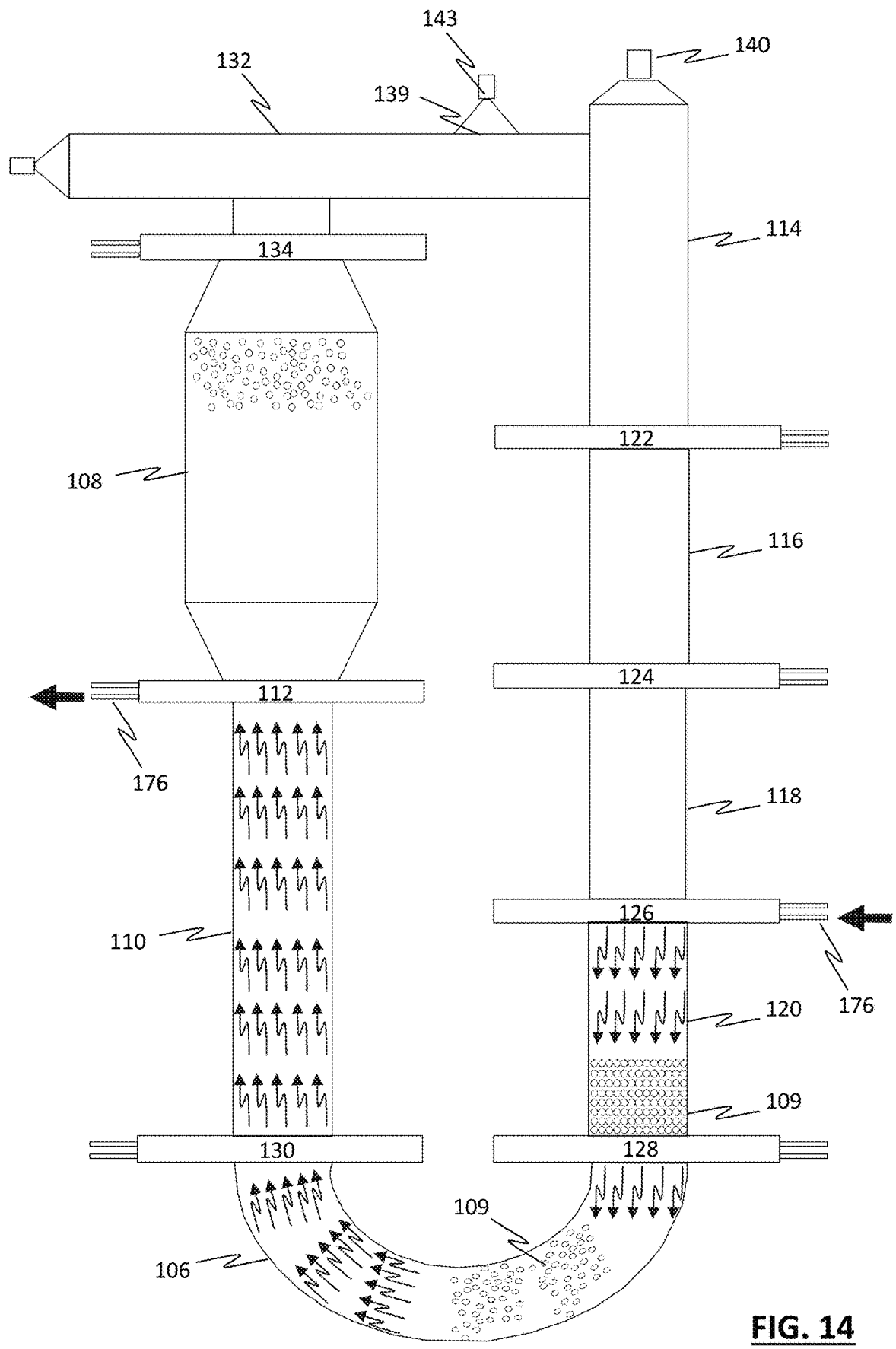
FIG. 14 is a side view of the purification system of FIG. 4 illustrating another phase of operation, in accordance with one embodiment of the invention.
Figure 15:
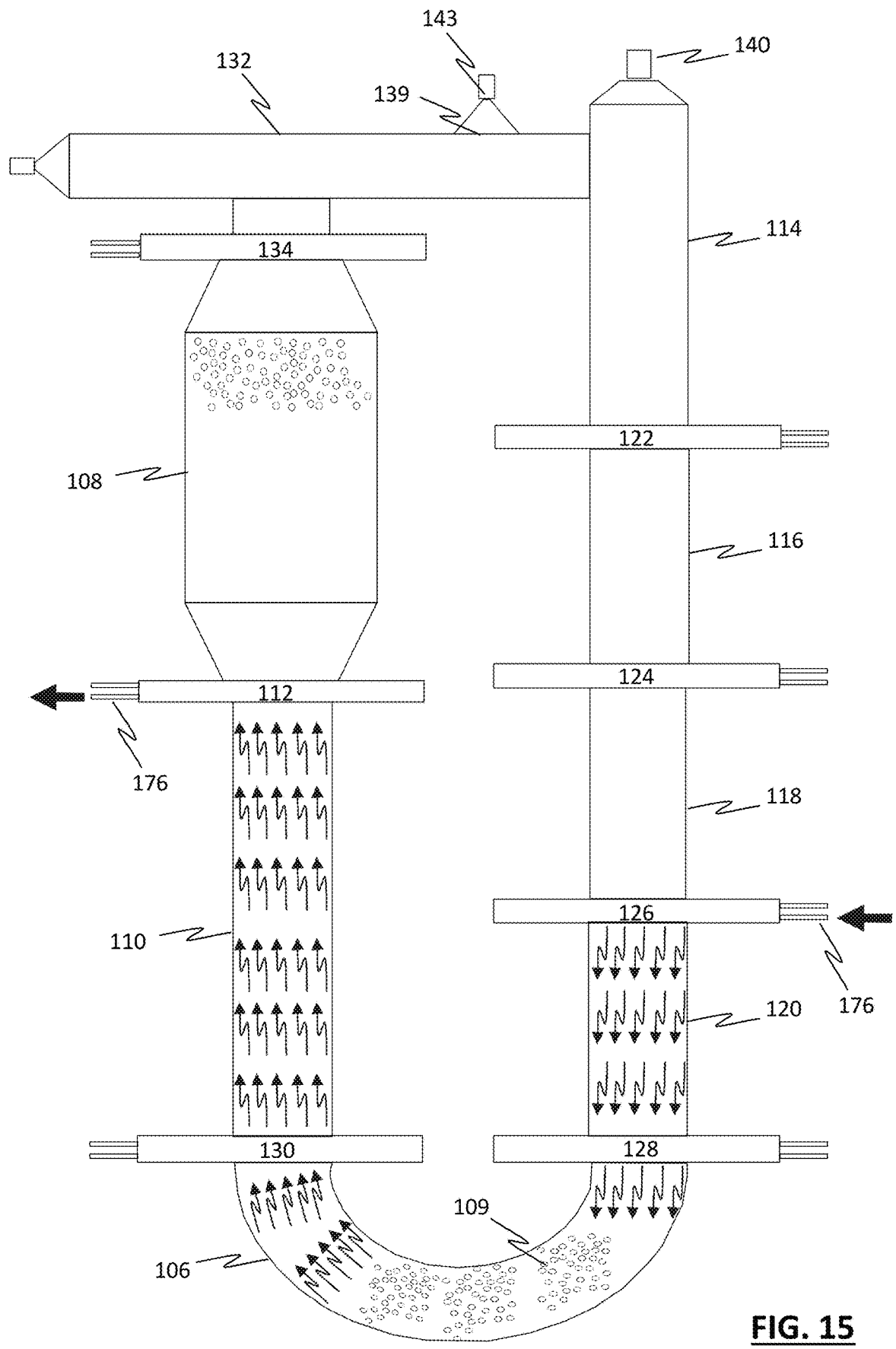
FIG. 15 is a side view of the purification system of FIG. 4 illustrating another phase of operation, in accordance with one embodiment of the invention.
Figure 16:
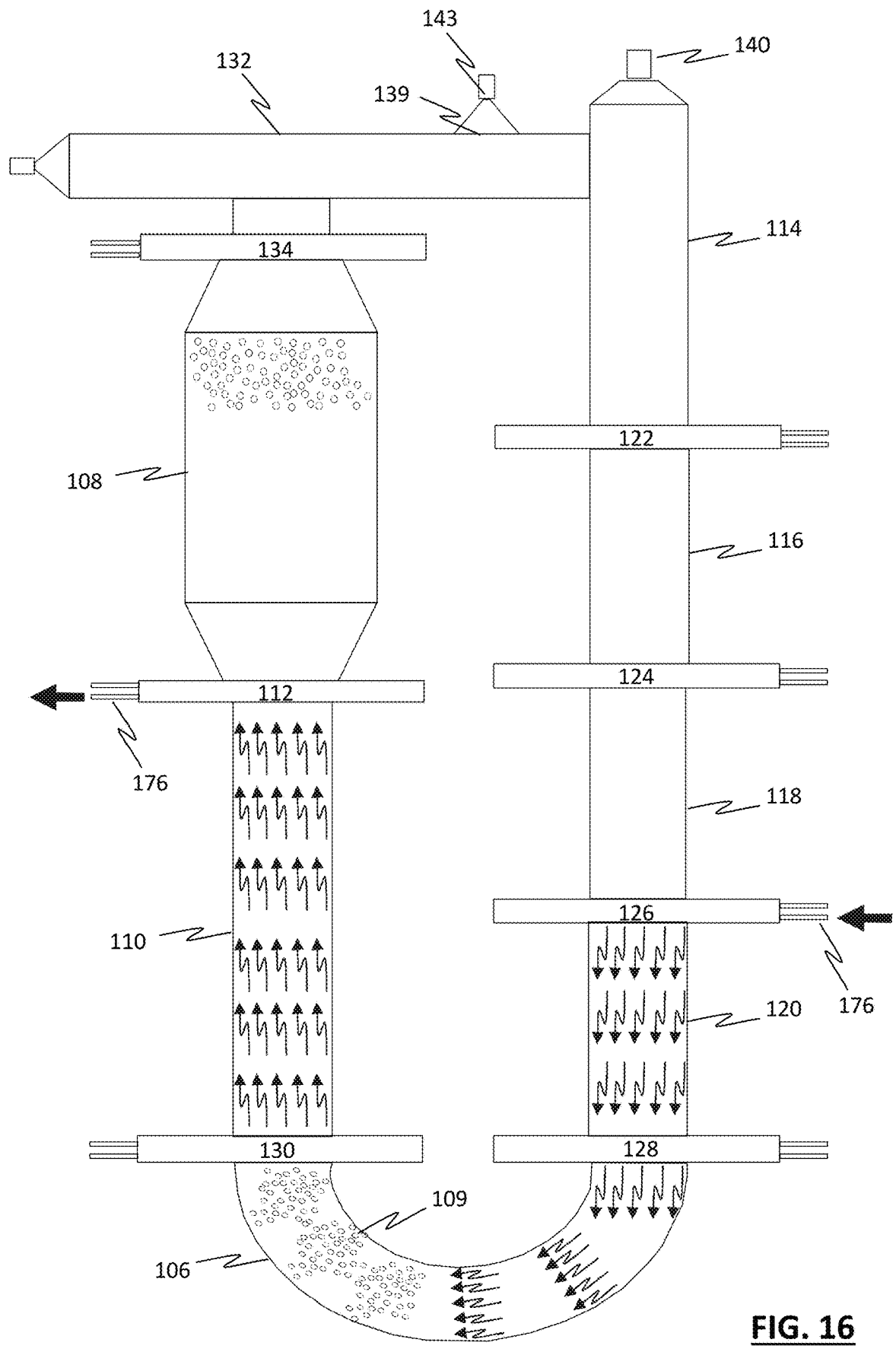
FIG. 16 is a side view of the purification system of FIG. 4 illustrating another phase of operation, in accordance with one embodiment of the invention.
Figure 17:
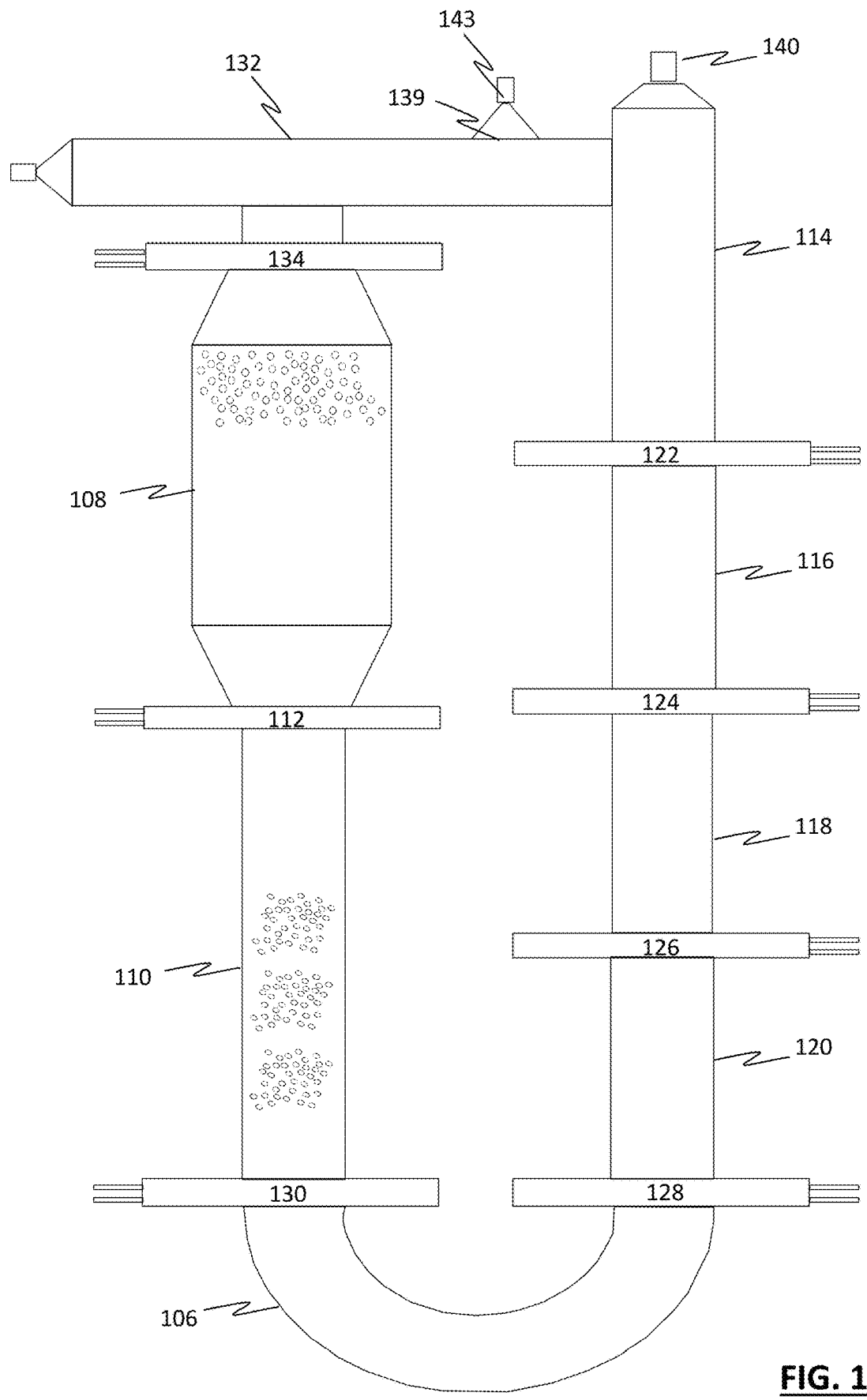
FIG. 17 is a side view of the purification system of FIG. 4 illustrating another phase of operation, in accordance with one embodiment of the invention.

Referring to FIG. 12, the fourth configurable gate valve 126 is opened and resin movement fluid 113 is introduced into the wash tube section 118 via the third portal flow tube 176 of the third configurable gate valve 124, into the third portal cavity 172, through the frit separating the third portal cavity 172 and the wash tube section 118 causing the MOI resin 111 to advance into the elution tube section 120. Referring to FIG. 13, at this point the fourth configurable gate valve 126 is closed and a solution 117 containing solutes required to remove the MOI from the MOI resin is introduced into the elution tube section 120 via the third portal flow tube 176 of the fourth configurable gate valve 126, into the third portal cavity 172 and through the frit separating the third portal cavity 172 and the elution tube section 120 and into the elution tube section 120. The solution then flows into and through the resin bed contained in the elution tube section 120 where the MOI is removed from the resin due to the interaction of the solution and resin. In another embodiment, as the solution is flowing through the elution tube section 120 section, an electric current may be introduced (such as, for example via the electrodes included in the elution tube section 120). The solution containing the MOI then flows through a frit separating the second portal cavity 170 of the fifth configurable gate valve 128 and the elution tube section 120, into the second portal cavity 170 and through the second portal flow tube 174 where the solution containing the MOI is collected and the MOI is retrieved.

Once the MOI is removed from the MOI resin 111 and collected, the eluted resin 109 is advanced through the U-shaped tube connector 106, into the regeneration section 110. As the purification system 100 is intended to be used with multiple batches of MOI's (in an assembly line fashion), the eluted resin 109 may be used to replace the resin being used. Referring to FIG. 14, FIG. 15, FIG. 16 and FIG. 17, this may be accomplished by opening the fifth configurable gate valve 128 and sixth configurable gate valve 130 and introducing a resin movement buffer 113 into elution section 120 via the third portal flow tube 176 of the fourth configurable gate valve 126 to cause the eluted resin 109 to advance into and through the U-shaped connection tube 106 and into the regeneration section 110. The resin movement buffer 113 flows out of the third portal flow tube 176 of the first configurable gate valve 112. Once the eluted resin 109 is located within the regeneration section 110, the fifth configurable gate valve 128 and sixth configurable gate valve 130 are closed.

Figure 18:
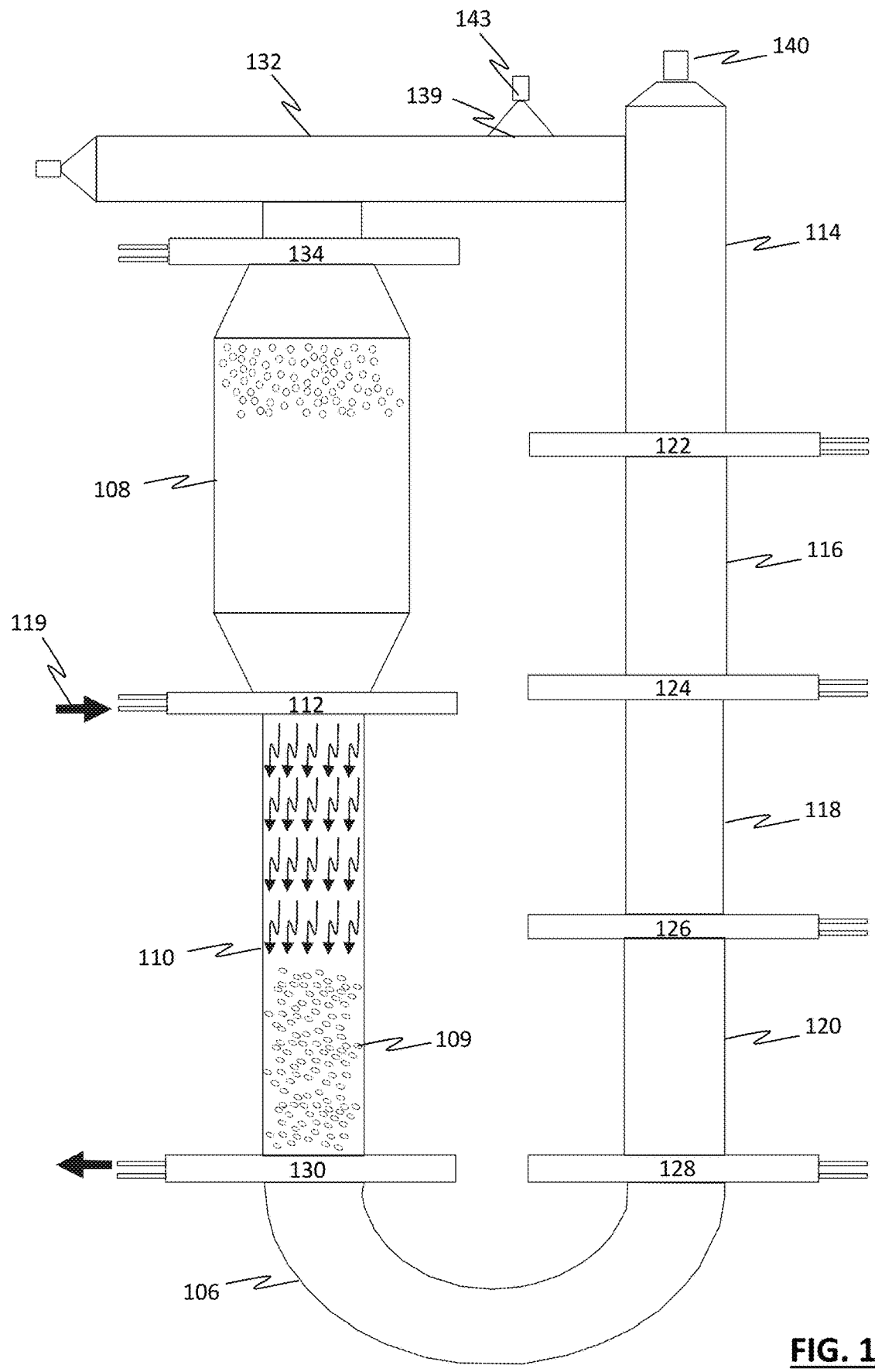
FIG. 18 is a side view of the purification system of FIG. 4 illustrating another phase of operation, in accordance with one embodiment of the invention.

Referring to FIG. 18, at this point, a solution 119 containing solutes required to remove residual contaminates from the eluted resin and prepare the eluted resin for absorption is introduced into the regeneration tube section 110 via the third portal flow tube 176 of the first configurable gate valve 112, into the third portal cavity 172 and through the frit separating the third portal cavity 172 and the regeneration tube section 110 and into the regeneration tube section 110. The solution then flows into and through the bed of eluted resin 109 contained in the regeneration tube section 110, where residual molecules are removed from the resin due to the interaction of the solution and the resin. The resin is also chemically prepared to absorb the MOI due to the interaction of the solution and resin. In another embodiment, as the solution is flowing through the regeneration tube section 110, an electric current may be (such as, for example via the electrodes included in the regeneration tube section 110). The solution then flows through a frit separating the second portal cavity 170 of the sixth configurable gate valve 130 and the regeneration tube section 110, into the second portal cavity 170 and through the second portal flow tube to collection or waste.

Figure 19:
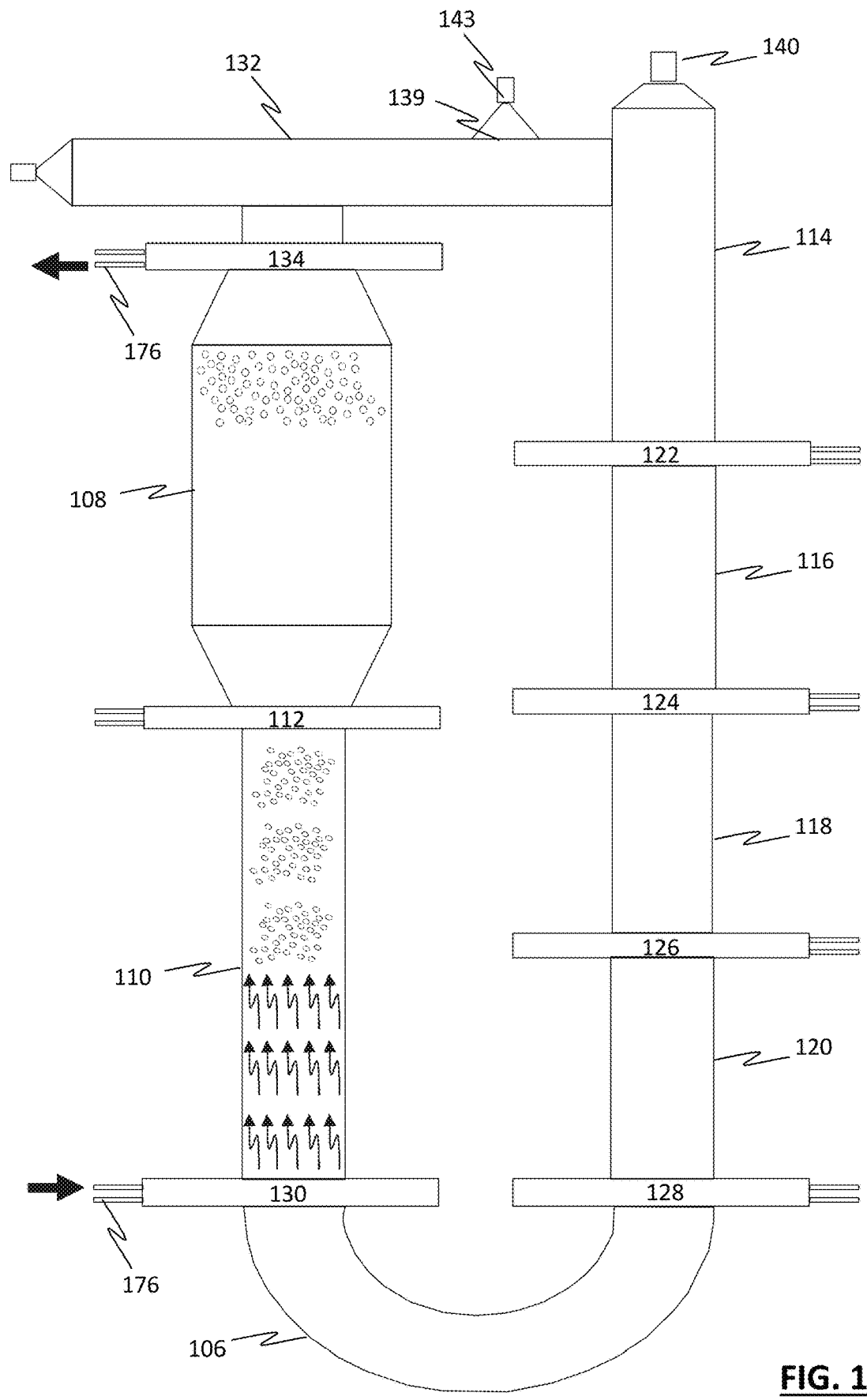
FIG. 19 is a side view of the purification system of FIG. 4 illustrating another phase of operation, in accordance with one embodiment of the invention.
Figure 20:
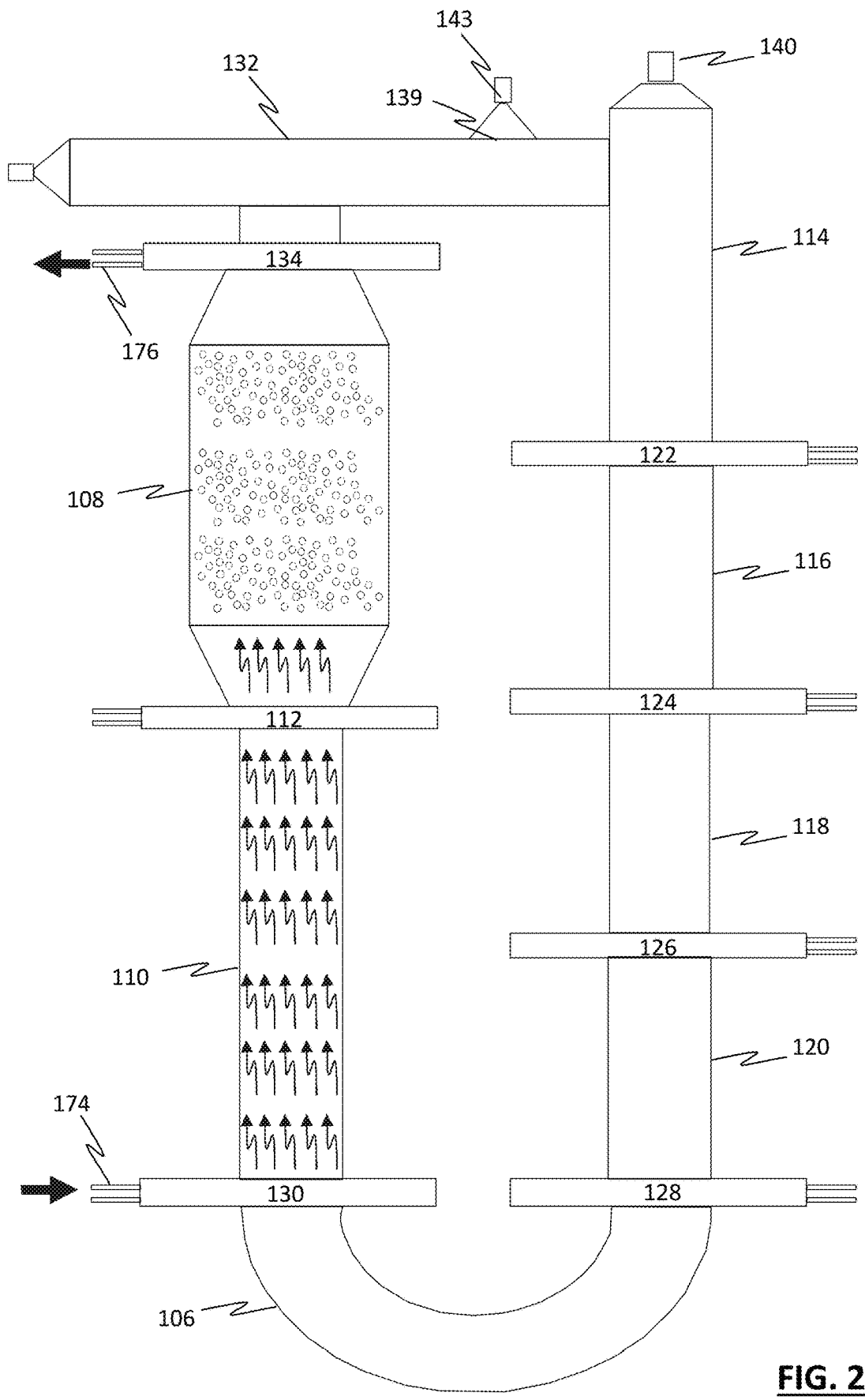
FIG. 20 is a side view of the purification system of FIG. 4 illustrating another phase of operation, in accordance with one embodiment of the invention.
Figure 21:
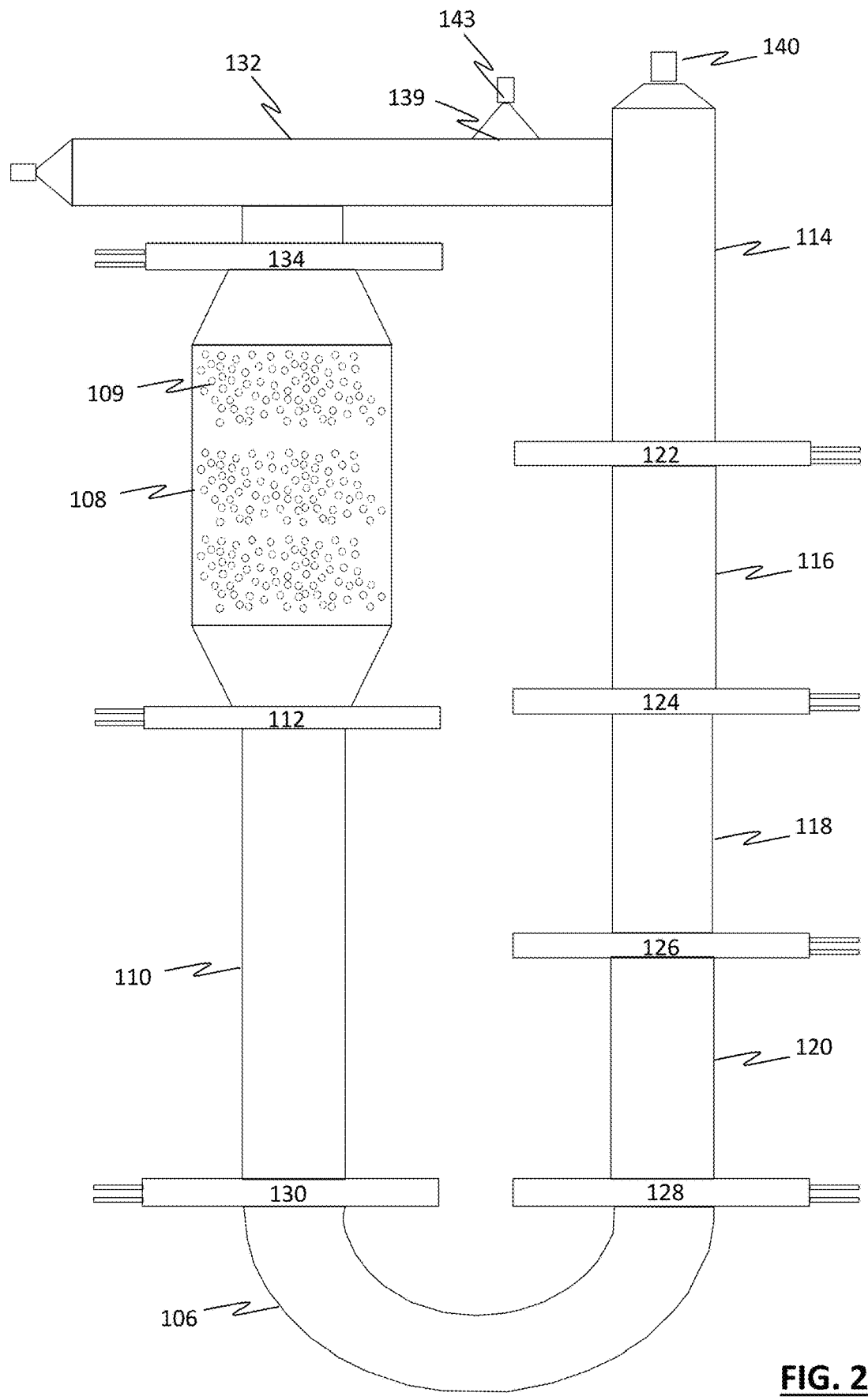
FIG. 21 is a side view of the purification system of FIG. 4 illustrating another phase of operation, in accordance with one embodiment of the invention.
Figure 22A:
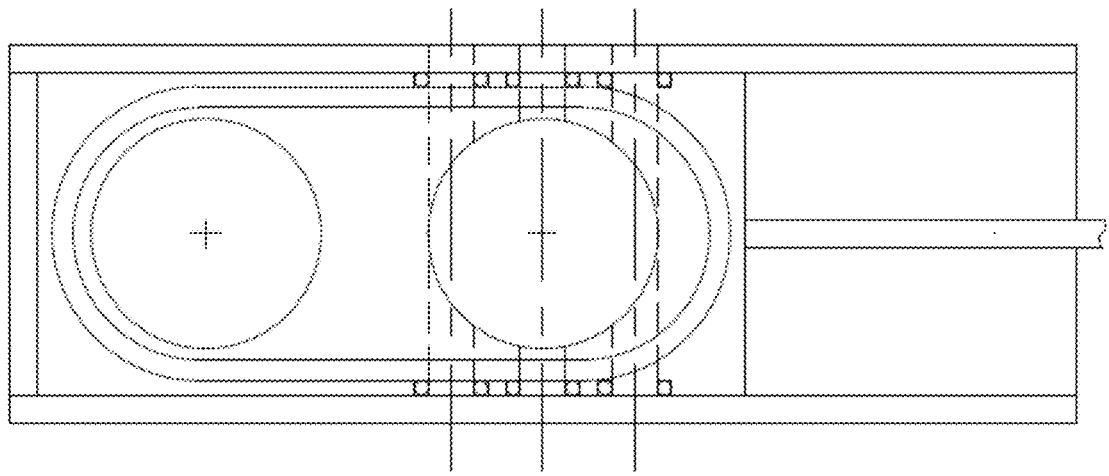
FIG. 22A is top down view of a configurable gate valve for use with the purification system of FIG. 1, in accordance with another embodiment of the invention.
Figure 22B:
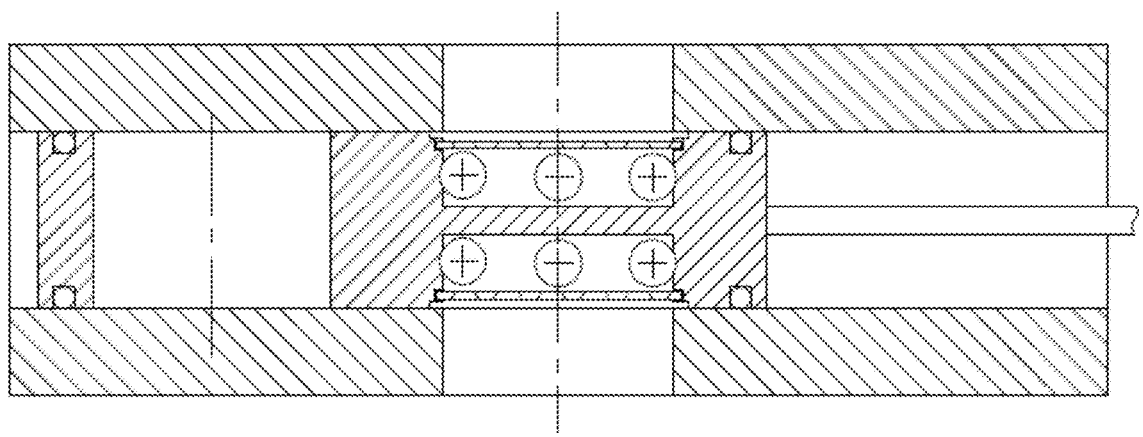
FIG. 22B is side sectional view of the configurable gate valve of FIG. 22A.
Figure 23A:
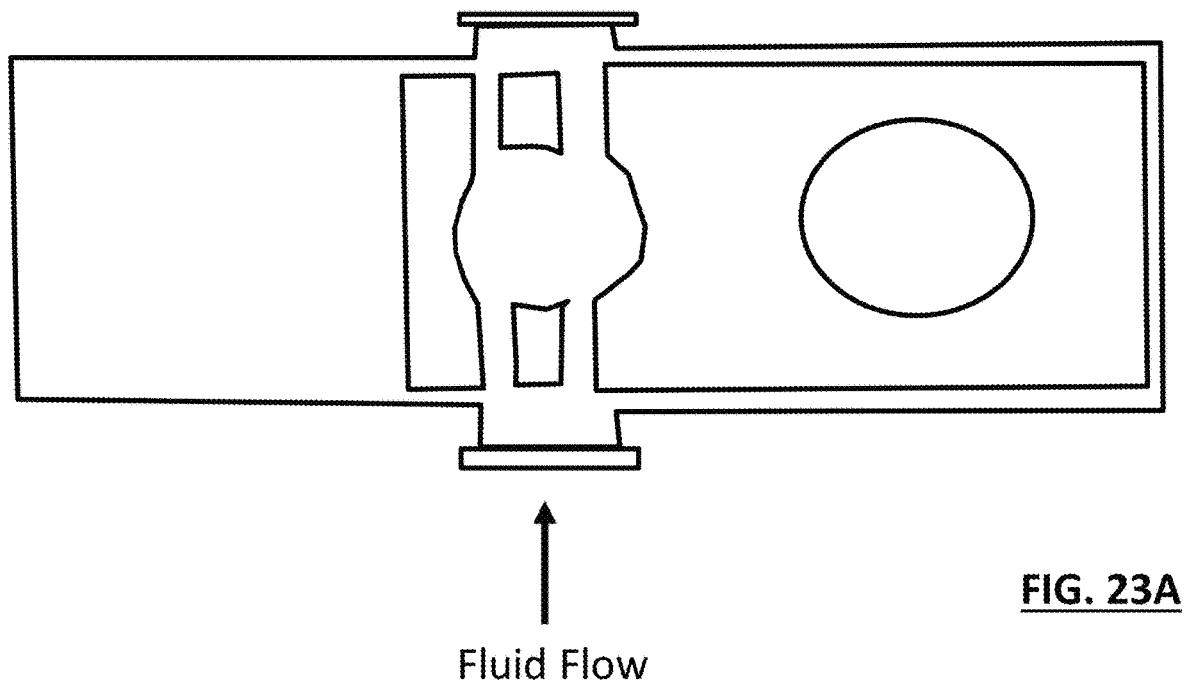
FIG. 23A is top down view of the configurable gate valve of FIG. 22A, in the 'closed' configuration where resin cannot flow from section to section.
Figure 23B:
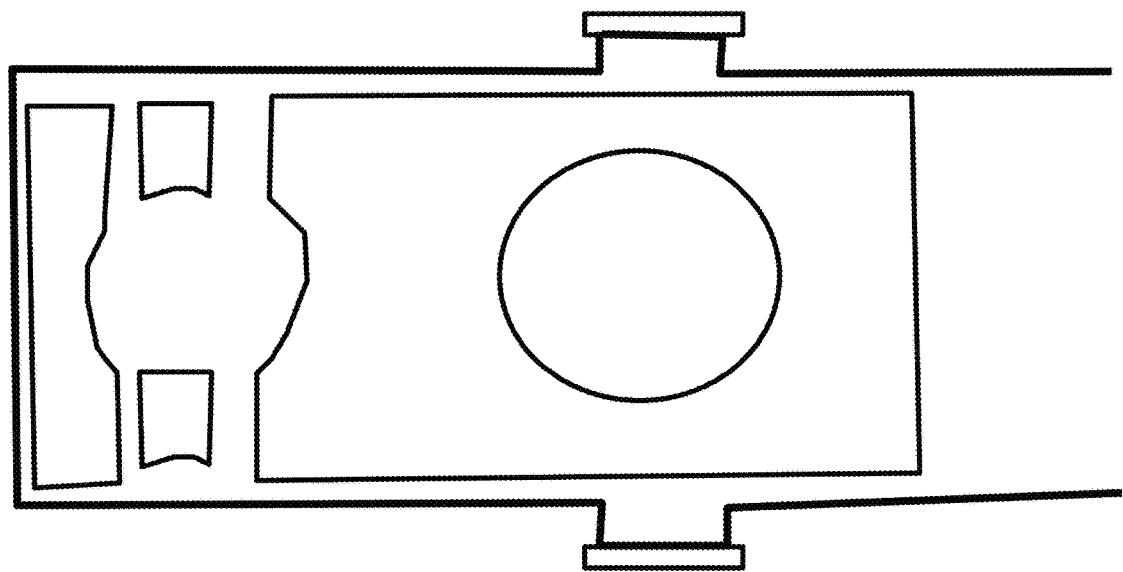
FIG. 23B is top down view of the configurable gate valve of FIG. 22A, in the 'open' configuration where resin can flow from section to section.

Referring to FIG. 19, FIG. 20 and FIG. 21, the clean resin 109 contained with the regeneration section 110 is moved into the absorption section 108 to replace the clean resin 109 that was previously removed. Accordingly, a resin movement buffer 113 is introduced into the regeneration section 110 via the second portal flow tube 174 of the fifth configurable gate valve 130 where the resin movement buffer 113 flows through the regeneration section 110 through the first configurable gate valve 112 (which is open), into the absorption section 108 and out of the third portal flow tube 176 of the second configurable gate valve 134. At this point, the first configurable gate valve 112 is closed and the absorption section 108 should contain clean resin 109.

It should be appreciated that the purification system 100 of the present invention is intended to operate with individual batches or with multiple batches. Accordingly, in another embodiment of the invention, the method includes processing multiple 'batches' of resin containing an MOI. In the embodiment where multiple batches are being processed, as the MOI resin 111 containing the MOI is moved from one section to another, the clean resin in sections 118-110 are moved into the next tube section. Accordingly, at this point resin located in the regeneration section 110 is advanced into the absorption section 108 to replace the resin that absorbed the MOI and that was advanced as described above. Additionally, resin contained in the elution tube section 120 is advanced into the regeneration section 110 and resin contained in the wash tube section 118 is advanced into the elution tube section 120 to replace the resin that was advanced into the regeneration section 110. Resin contained in the packing tube section 116 is advanced into the wash tube section 118 to replace the resin that was advanced into the elution tube section 120. It should be appreciated that at this point, the packing tube section 116 is devoid of resin and as the resin containing the MOI of interest is advanced from section to section, the resin contained in the sections forward of the section having the resin containing the MOI of interest is advanced as well.

In still yet another embodiment, the system 100 may incorporate a component which generates some or all of the reagents required by processes occurring in the wash tube section 118, elution tube section 120 and/or regeneration tube section 110. Thus, the reagent generator may generate the reagents on demand through an electrolysis approach, an oxidation-reduction approach, a galvanization approach, any combination of the electrolysis, oxidation-reduction approach and galvanization approach or any method/device suitable to the desired end purpose.

Referring to FIGS. 22A, FIG. 22B, FIG. 23A and FIG. 23B, an additional embodiment of a configurable gate valve 500 is shown, where the gate valve 500 has two depressions, or cavities in the top and bottom that are separated by an impermeable barrier (replaceable or non-replaceable), and that are covered with a fluid permeable frit (replaceable or non-replaceable) or filter. Each cavity has a row of one or more holes, or conduits, in its sides which extend parallel to the top and bottom surfaces of the gate valve 500 and which are substantially perpendicular to the sides of the gate valve 500, forming two rows of holes, or conduits, in each side. It should be appreciated that the top row of holes correspond with the cavity in the top portion of the gate valve 500 and the bottom row of holes correspond with the cavity in the bottom portion of the gate valve 500. When the gate valve 500 is in the closed configuration (i.e. the flow of resin from one section to its neighboring section is stopped), the holes in the side of the casing will be in flow communication with the holes described above such that the top row of holes in the gate valve 500 will align with the top row holes in the side of the gate valve 500 and allow the passage of fluid through the side of the gate valve 500, through the gate valve 500 and into the top cavity of the gate valve 500, and the bottom row of holes in the side of the gate valve 500 will allow the passage of fluid through the side of the gate valve 500, through the gate valve 500 and into the bottom cavity of the gate valve 500. The holes in the gate valve 500 may be connected to manifolds or distribution chambers mounted on the sides of the gate valve 500 which may then be connected to a fluid supply conduit.

It should be appreciated that in one embodiment, the absorption section 108 provides for a wider absorption section which allows a higher volume flow rate of solution containing MOI relative to the flow rates in the other sections. A wide diameter increases the volumetric flow rate while maintaining a similar linear flow rate, but lower volume flow rate found in a narrower diameter section. This higher flow rate allows for more solution to be processed in a given time. Moreover, the wider diameter prevents excessive bed compression and a reduced void volume resulting in high back pressure. It should be further appreciated that the cross-over section 132 transports the resin from the absorption section to the packing section. This section includes two (2) buffer injection systems (142 and 143) which maintain resin in suspension during transport. Upon transmission from the absorption section, the injection of buffer prevents the resin from falling out of suspension and accumulating along the horizontal path of the transport section.

The cross-over section connects to the transport section at a perpendicular angle which conducts the fluidized resin into the transport section. The injection port 142 injects buffer down the length of the cross-over section 132 to produce turbulence which prevents the resin from aggregating along the bottom of the cross-over section. It should be appreciated that the turbulence induced by the injectors maintains the resin beads in a consistent evenly distributed suspension that settles to form a bed of resin where the top of the bed is flat and parallel with the bottom of the bed which rests on the bottom valve of the packing section. Moreover, the transport section includes a packing buffer inlet (136) which injects packing buffer across the diameter of the packing section parallel to the vertical axis. And perpendicular to the cross section of the packing section. The flow from the packing buffer inlet produces an even flow of solution that provides pressure and flow to pack the low density, small bead sized agarose, ceramic, cellulosic or other low density resin in a consistent bed for washing and elution. The packing buffer inlet flow provides hydraulic pressure to force the compressed resin bed downward into the wash section when the valve between the packing section and was section is opened. Additionally, the wash and elution sections are narrower and of greater length than the absorption section which provide a greater residence time for solutions while using low volume flow rates. The longer length allows for a longer flow path that increases resolution of the molecule of interest from undesired molecules.

It should be further appreciated that when a valve is open, passage of a continuous cylindrical mass of packed congregated resin beads is allowed to pass from one tube section into another. When closed, the valves allow the flow of process fluids from one end of the tube to another parallel to the longitudinal axis of the tube (lengthwise) down the entire length of the tube, entering and exiting across the entire diameter of the tube, without any change of direction entering and passing from the tube through the valve. When closed, generate a solvent front which is required for a resolution of an MOI and undesired molecule. However, when open, the valve allows the passage of the resin bed, pushed hydraulically via the injection of buffer solution through a closed valve behind the packed resin bed, while maintaining the contiguous integrity of the resin bed. The separate Absorption, Wash, Elution, and Regeneration sections allow the simultaneous performance of all the steps involved in a chromatographic process. It should be appreciated that the separation of the sections allows for the use of different buffers in each section and the separate sections allow for different lengths, diameters, or geometry of the different sections to enhance the performance of the chemical process occurring in each section. Moreover, the flow rates in each section can be different from one section to another which increases the performance in each section.

It should be appreciated that the method of the present invention may be embodied, in whole or in part, via software, firmware and/or hardware. For example, switches and/or other actuation devices may be used to open/close gate valves or resin flow valves. Moreover, it should be appreciated that although the method of the present invention may be implemented, in whole or in part, via software, hardware, firmware and/or any combination thereof, it is also contemplated that the method of the present invention may also be implemented manually, in whole or in part, without the use of software, hardware, firmware and/or any combination thereof.

Moreover, it should be appreciated that each of the elements of the present invention may be implemented in part, or in whole, in any order suitable to the desired end purpose. In accordance with an exemplary embodiment, the processing required to practice the method of the present invention, either in whole or in part, may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing. It should also be appreciated that the embodiments disclosed herein are for illustrative purposes only and include only some of the possible embodiments contemplated by the present invention.

Furthermore, the invention may be wholly or partially embodied in the form of a computer system or controller implemented processes. It should be appreciated that any type of computer system (as is well known in the art) may be used and that the invention may be implemented via any type of network setup, including but not limited to a LAN and/or a WAN (wired or wireless). The method of the invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. When implemented on a general-purpose controller the computer program code segments may configure the controller to create specific logic circuits.

While the invention has been described with reference to an exemplary embodiment, it will be understood by those skilled in the art that various changes, omissions and/or additions may be made and equivalents may be substituted for elements thereof without departing from the spirit and scope of the invention. For example, one or more sections of the invention may be left out or implement in combination with other sections. In addition, many modifications may be made to adapt a particular situation or material to the teachings of the invention without departing from the scope thereof. Moreover, it is contemplated that elements of one embodiment may be combined with elements of other embodiments as desired. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. A purification system for separating a molecule of interest from a solution, the system comprising:
   a plurality of configurable plug valves, wherein each of the plurality of configurable plug valves is configurable between an open configuration and a closed configuration, wherein when in the closed configuration the configurable plug valves are configure for bi-directional portal flow;
   a plurality of inlets;
   a plurality of resin processing sections configured in a series connection, wherein each of the resin processing sections is controllably separated from each other via the configurable plug valve, wherein at least one of the plurality of configurable plug valves is configured to at least one of introduce at least one of a fluid and a resin into at least one of the plurality of resin processing sections and evacuate at least one of the fluid and the resin out of at least one of the plurality of resin processing sections, and wherein the plurality of inlets are configured to introduce fluid and/or resin into one or more of the plurality of resin processing sections and wherein the plurality of resin processing sections includes an absorption section and a regeneration section, wherein the absorption section is located above the regeneration section and separated from the regeneration section via one of the plurality of configurable plug valves, and where the absorption section includes a larger diameter that the regeneration section; and at least one valve fluid permeable frit located in line with a valve loop port and configured to interact with and filter debris from at least one of the fluid and the resin.

\* \* \* \* \*